US012624724B2

(12) United States Patent
Minami et al.

(10) Patent No.: US 12,624,724 B2
(45) Date of Patent: May 12, 2026

(54) THRUST BEARING

(71) Applicant: TOYOTA JIDOSHA KABUSHIKI KAISHA, Toyota Aichi-ken (JP)

(72) Inventors: Takahiro Minami, Sunto-gun Shizuoka-ken (JP); Hidefumi Nakao, Yokohama Kanagawa-ken (JP); Takato Hatano, Seto Aichi-ken (JP); Katsuhisa Takahashi, Numazu Shizuoka-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 11 days.

(21) Appl. No.: 18/965,476

(22) Filed: Dec. 2, 2024

(65) Prior Publication Data

US 2025/0188985 A1     Jun. 12, 2025

(30) Foreign Application Priority Data

Dec. 7, 2023     (JP) ................................. 2023-206955

(51) Int. Cl.
F16C 17/04 (2006.01)

(52) U.S. Cl.
CPC ........ F16C 17/042 (2013.01); F16C 2360/24 (2013.01)

(58) Field of Classification Search
CPC . F16C 17/042; F16C 32/0677; F16C 2360/24
See application file for complete search history.

(56) References Cited

U.S. PATENT DOCUMENTS

| | | | | |
|---|---|---|---|---|
| 5,498,082 A | * | 3/1996 | Nadjafi | ................. F16C 17/042 |
| | | | | 384/105 |
| 5,833,369 A | | 11/1998 | Heshmat | |
| 5,938,341 A | * | 8/1999 | Eccles | .................... F16C 27/08 |
| | | | | 384/106 |
| 5,961,217 A | | 10/1999 | Heshmat | |
| 6,702,463 B1 | | 3/2004 | Brockett et al. | |
| 6,752,533 B2 | * | 6/2004 | Saville | ................. F16C 17/042 |
| | | | | 384/106 |
| 9,062,712 B1 | | 6/2015 | Bruckner | |
| 2005/0271311 A1 | * | 12/2005 | Saville | ................. F16C 17/042 |
| | | | | 384/106 |
| 2021/0071710 A1 | | 3/2021 | Shakil et al. | |
| 2022/0275827 A1 | | 9/2022 | Pye et al. | |

FOREIGN PATENT DOCUMENTS

| | | | | |
|---|---|---|---|---|
| CN | 106763151 A | * | 5/2017 | ............. F16C 27/02 |
| CN | 111120503 A | * | 5/2020 | ........... F16C 17/042 |
| CN | 111637151 A | | 9/2020 | |
| CN | 114033790 A | * | 2/2022 | ............. F16C 35/02 |
| CN | 114233746 A | * | 3/2022 | ........... F16C 17/042 |
| FR | 2761427 A1 | * | 10/1998 | ............. F16C 27/02 |
| KR | 20010063914 A | * | 7/2001 | ............. F16C 17/06 |
| KR | 10-1958456 B1 | | 3/2019 | |

OTHER PUBLICATIONS

DESCRIPTION_CN111637151A.*

* cited by examiner

*Primary Examiner* — Phillip A Johnson
(74) *Attorney, Agent, or Firm* — Dinsmore & Shohl LLP

(57)     ABSTRACT

A thrust bearing includes an upper foil portion including a bearing surface that faces a rotary member rotatable about a rotation axis, and a lower foil portion that elastically supports the upper foil portion. The upper foil portion is divided into a plurality of portions.

9 Claims, 12 Drawing Sheets

FIG. 4
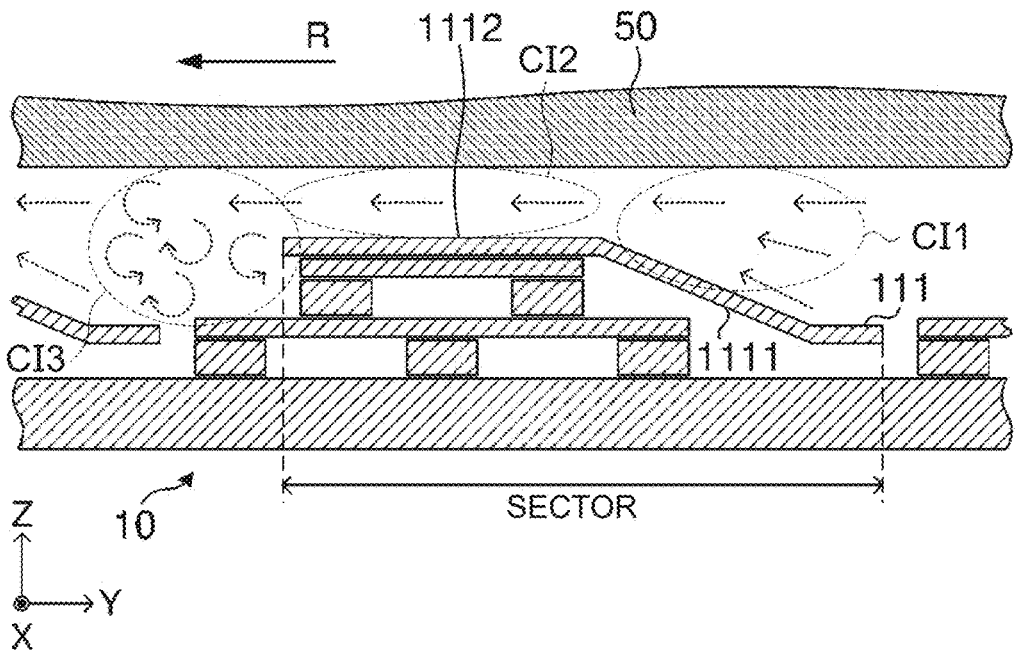
FIG. 5A
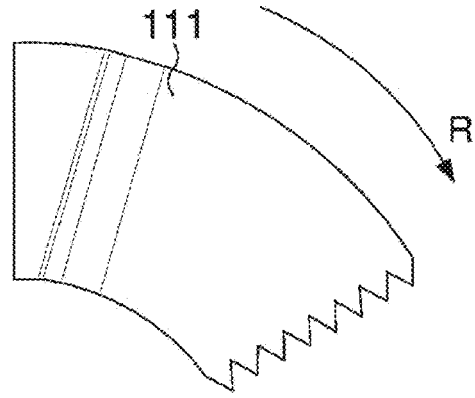
FIG. 5B          FIG. 5C
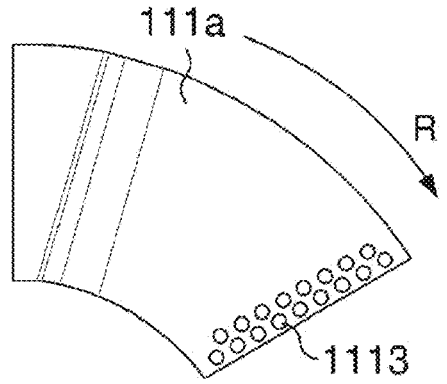
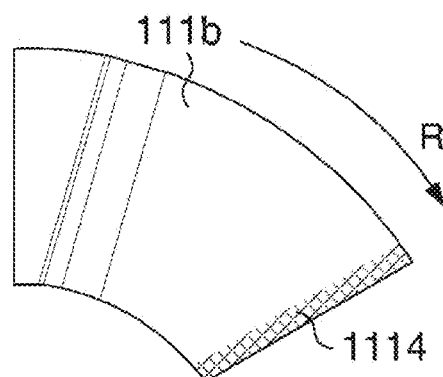

THRUST BEARING

CROSS-REFERENCE TO RELATED APPLICATION

This application claims priority to Japanese Patent Application No. 2023-206955 filed on Dec. 7, 2023, incorporated herein by reference in its entirety.

BACKGROUND

1. Technical Field

The present disclosure relates to a thrust bearing, and more particularly, to a technical field of a foil laminated fluid thrust bearing.

2. Description of Related Art

For example, U.S. Pat. No. 6,702,463 discloses a foil laminated fluid thrust bearing. U.S. Pat. No. 9,062,712 is another related art document related to the present disclosure.

SUMMARY

The thrust bearing is disposed between a rotary member and a stationary member. The thrust bearing includes a top foil portion having a bearing surface that faces the rotary member. The thrust bearing bears a thrust in a direction in which the rotation shaft of the rotary member presses the bearing in a non-contact manner via a fluid film (e.g., air) between the rotary member and the top foil portion. When the relative speed between the thrust bearing and the rotary member is relatively high, the load capacity of the thrust bearing may decrease due to an increase in temperature of the fluid film caused by viscous heat generation. In the thrust bearing described in U.S. Pat. No. 6,702,463, the top foil portion is formed from a single member. Therefore, in the thrust bearing described in U.S. Pat. No. 6,702,463, the temperature of the fluid film is likely to increase and the load capacity of the thrust bearing is likely to decrease.

The present disclosure provides a thrust bearing in which a decrease in the load capacity of the thrust bearing can be suppressed.

A aspect of the present disclosure relates to a thrust bearing. The thrust bearing includes an upper foil portion including a bearing surface that faces a rotary member rotatable about a rotation axis, and a lower foil portion that elastically supports the upper foil portion. The upper foil portion is divided into a plurality of portions.

In the thrust bearing according to the aspect of the present disclosure, the lower foil portion may include an underlay foil portion including a first plate-shaped member that planarly supports part of the bearing surface of the upper foil portion.

In the thrust bearing according to the aspect of the present disclosure, the lower foil portion may include a first support foil portion disposed below the underlay foil portion and including a plurality of first support members, a pad foil portion disposed below the first support foil portion and including a second plate-shaped member corresponding to the first plate-shaped member, and a second support foil portion disposed below the pad foil portion and including a plurality of second support members. The first plate-shaped member may be supported by two first support members out of the plurality of first support members. One first support member out of the two first support members may be supported by one part of the second plate-shaped member and two second support members out of the plurality of second support members. The other first support member out of the two first support members may be supported by a different part from the one part of the second plate-shaped member, one second support member out of the two second support members, and a different second support member from the two second support members.

In the thrust bearing according to the aspect of the present disclosure, the lower foil portion may elastically support the upper foil portion to cause a support stiffness of each of the plurality of portions on an upstream side in a rotation direction of the rotary member to be smaller than a support stiffness of each of the plurality of portions on a downstream side in the rotation direction.

In the thrust bearing according to the aspect of the present disclosure, the one first support member out of the two first support members may, in the rotation direction, be disposed on the upstream side of the other first support member out of the two first support members. A distance between the two second support members may be larger than a distance between the one second support member out of the two second support members and the different second support member from the two second support members.

In the thrust bearing according to the aspect of the present disclosure, a thickness of the first plate-shaped member on the upstream side in the rotation direction may be smaller than a thickness of the first plate-shaped member on the downstream side in the rotation direction.

In the thrust bearing according to the aspect of the present disclosure, the one first support member out of the two first support members may, in the rotation direction, be disposed on the upstream side of the other first support member out of the two first support members. A thickness of the one first support member out of the two first support members may be smaller than a thickness of the other first support member out of the two first support members.

In the thrust bearing according to the aspect of the present disclosure, the first plate-shaped member of the underlay foil portion may be disposed in an area surrounded by a first annular member. The underlay foil portion may further include the first annular member extending in a circumferential direction of the thrust bearing, and a first connection member connecting the first annular member and the first plate-shaped member. A length along a shape of the first connection member from a first connection point to a second connection point may be larger than a length of a straight line connecting the first connection point and the second connection point. The first connection point may be a connection point between the first annular member and the first connection member. The second connection point may be a connection point between the first plate-shaped member and the first connection member.

In the thrust bearing according to the aspect of the present disclosure, the first support foil portion may include a second annular member extending in a circumferential direction of the thrust bearing, the first support members disposed in an area surrounded by the second annular member, and a second connection member connecting the second annular member and the one first support member out of the plurality of first support members. A length along a shape of the second connection member from a third connection point to a fourth connection point may be larger than a length of a straight line connecting the third connection point and the fourth connection point. The third connection point may be a connection point between the second annular member and the second connection member. The fourth connection point may be a connection point between the one first support member and the second connection member.

In the thrust bearing according to the aspect of the present disclosure, the one part of the second plate-shaped member and the two second support members may define a double-end supported beam structure that supports the one first support member out of the two first support members. The different part from the one part of the second plate-shaped member, the one second support member out of the two second support members, and the different second support member from the two second support members may define a double-end supported beam structure that supports the other first support member out of the two first support members.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 shows an example of an operation of the thrust bearing according to the embodiments;

FIG. 5A shows one mode of a plate-shaped member of the top foil portion according to the embodiments;

FIG. 5B shows another mode of the plate-shaped member of the top foil portion according to the embodiments;

FIG. 5C shows another mode of the plate-shaped member of the top foil portion according to the embodiments;

DETAILED DESCRIPTION OF EMBODIMENTS

First Embodiment

A thrust bearing according to a first embodiment will be described with reference to FIGS. 1 to 4.

The configuration of a thrust bearing 10 according to the first embodiment will be described with reference to FIGS.

Figure 1:
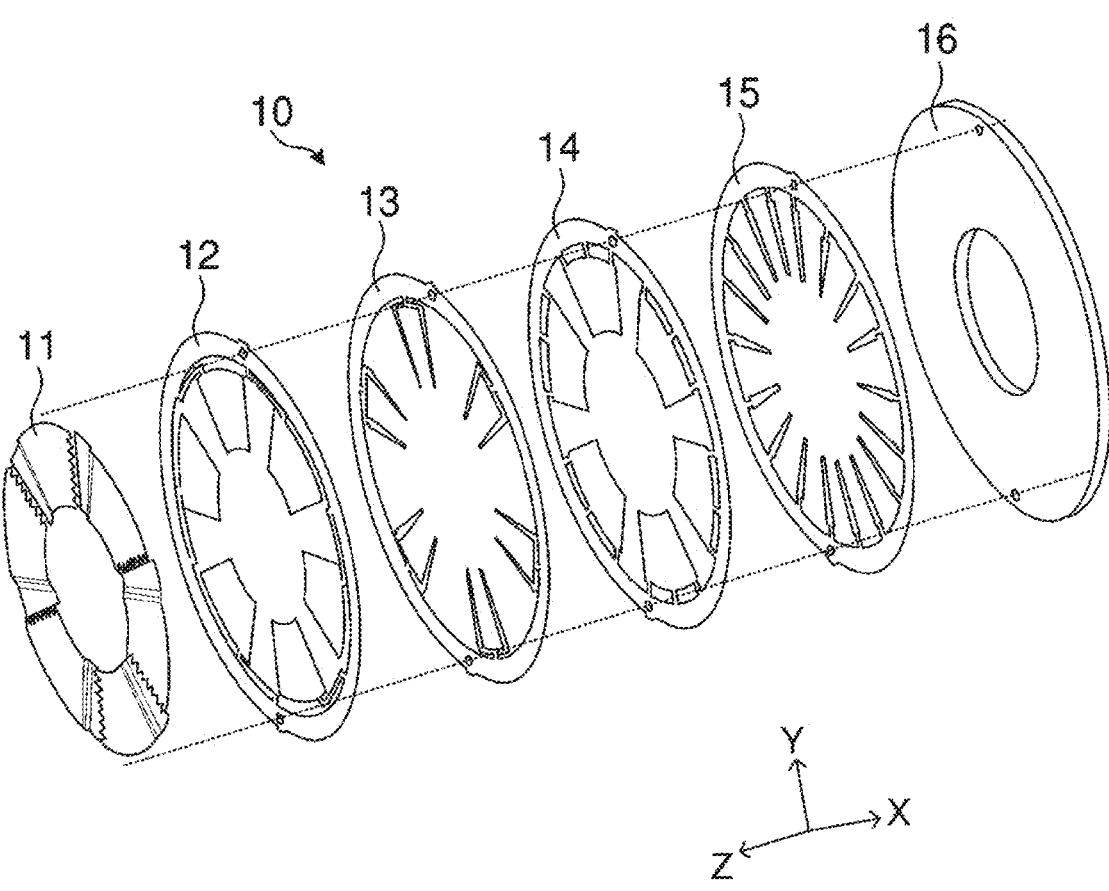
FIG. 1 is a perspective view showing members constituting a thrust bearing according to embodiments.

1 to 2F. FIG. 1 is a perspective view showing members constituting the thrust bearing 10. FIGS. 2A to 2F are plan views showing the members constituting the thrust bearing 10.

Figure 2A:
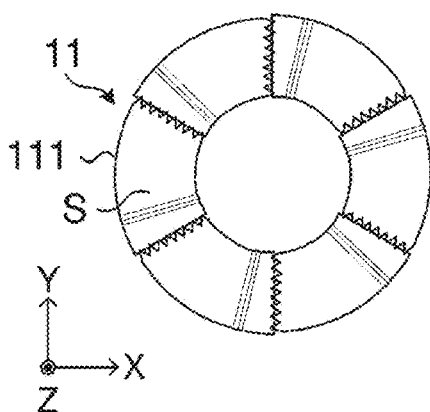
FIG. 2A is a plan view showing the member constituting the thrust bearing according to the embodiments.
Figure 2B:
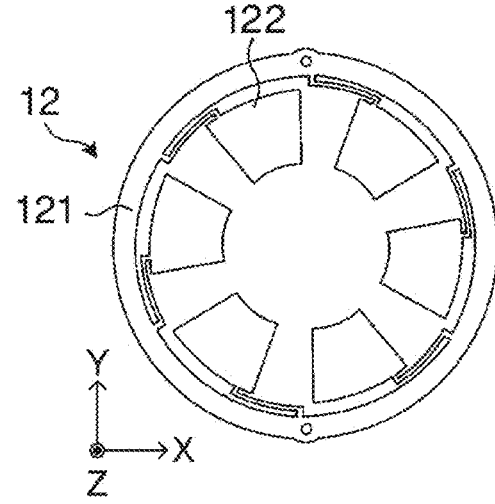
FIG. 2B is a plan view showing the member constituting the thrust bearing according to the embodiments.
Figure 2C:
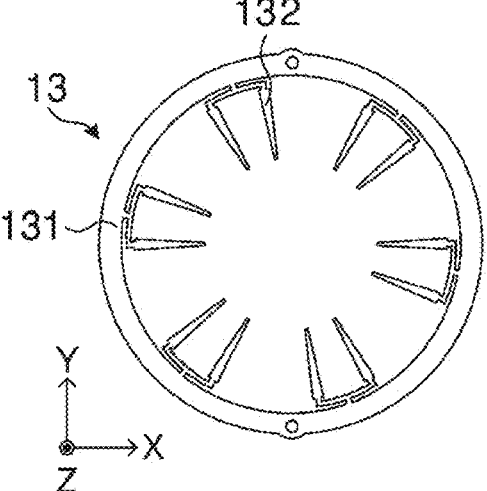
FIG. 2C is a plan view showing the member constituting the thrust bearing according to the embodiments.
Figure 2D:
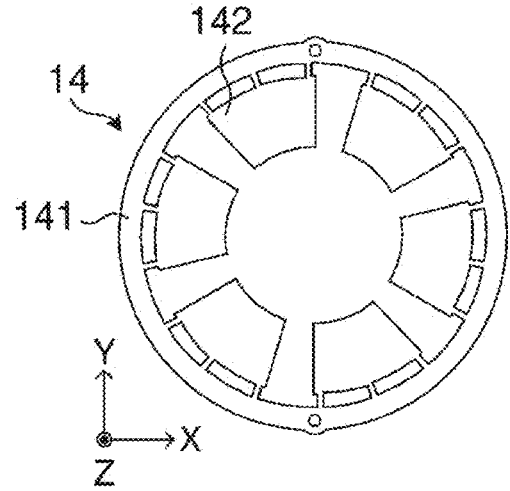
FIG. 2D is a plan view showing the member constituting the thrust bearing according to the embodiments.
Figure 2E:
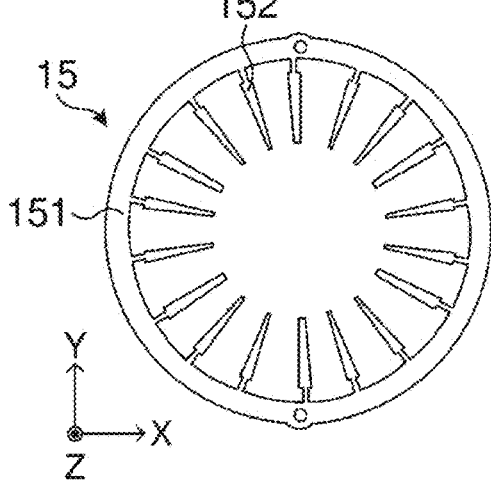
FIG. 2E is a plan view showing the member constituting the thrust bearing according to the embodiments.
Figure 2F:
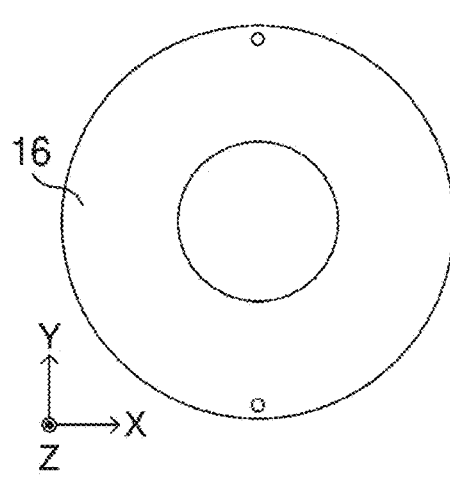
FIG. 2F is a plan view showing the member constituting the thrust bearing according to the embodiments.

In FIGS. 1 to 2F, the thrust bearing 10 includes a top foil portion 11, an underlay foil portion 12, a support foil portion 13, a pad foil portion 14, a support foil portion 15, and a back plate 16.

A Z-axis direction in FIG. 1 may be a height direction. In this case, a +Z direction may represent an upward direction, and a −Z direction may represent a downward direction. In this case, the thrust bearing 10 includes the top foil portion 11, the underlay foil portion 12 disposed below the top foil portion 11, the support foil portion 13 disposed below the underlay foil portion 12, the pad foil portion 14 disposed below the support foil portion 13, the support foil portion 15 disposed below the pad foil portion 14, and the back plate 16 disposed below the support foil portion 15.

As shown in FIG. 2A, the top foil portion 11 includes six plate-shaped members 111. That is, the top foil portion 11 is divided into a plurality of members. The six plate-shaped members 111 define a bearing surface S that faces a rotary member (e.g., a rotary member 50 shown in FIG. 3B) that is rotatable about a rotation axis. The plate-shaped member 111 may also be referred to as "leaf". The number of plate-shaped members 111 is not limited to six, but may be five or less, or seven or more.

As shown in FIG. 2B, the underlay foil portion 12 includes an annular member 121 extending in a circumferential direction of the thrust bearing 10, and six plate-shaped members 122 disposed in an area surrounded by the annular member 121. The plate-shaped member 122 may also be referred to as "underlay foil". The number of plate-shaped members 122 is not limited to six, but may be five or less, or seven or more. The number of plate-shaped members 122 may correspond to the number of plate-shaped members 111.

As shown in FIG. 2C, the support foil portion 13 includes an annular member 131 extending in the circumferential direction of the thrust bearing 10, and 12 support members 132 disposed in an area surrounded by the annular member 131 and extending toward the center of the thrust bearing 10. Two support members 132 may be handled as a set. The number of support members 132 is not limited to 12, but may be 11 or less, or 13 or more. The number of support members 132 may correspond to the number of plate-shaped members 122.

As shown in FIG. 2D, the pad foil portion 14 includes an annular member 141 extending in the circumferential direction of the thrust bearing 10, and six plate-shaped members 142 disposed in an area surrounded by the annular member 141. The plate-shaped member 142 may also be referred to as "pad foil". The number of plate-shaped members 142 is not limited to six, but may be five or less, or seven or more. The number of plate-shaped members 142 may correspond to the number of plate-shaped members 122.

As shown in FIG. 2E, the support foil portion 15 includes an annular member 151 extending in the circumferential direction of the thrust bearing 10, and 18 support members 152 disposed in an area surrounded by the annular member 151 and extending toward the center of the thrust bearing 10. Three support members 152 may be handled as a set. The number of support members 152 is not limited to 18, but may be 17 or less, or 19 or more. The number of support members 152 may correspond to the number of plate-shaped members 142.

Figure 3A:
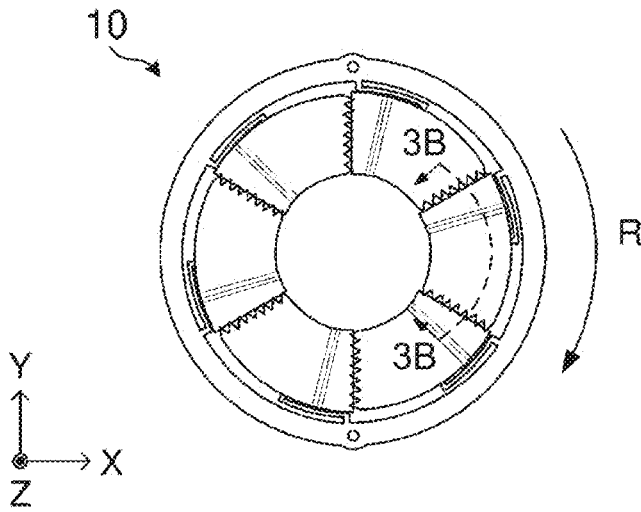
FIG. 3A is a plan view of the thrust bearing that is viewed from a top foil portion side.
Figure 3B:
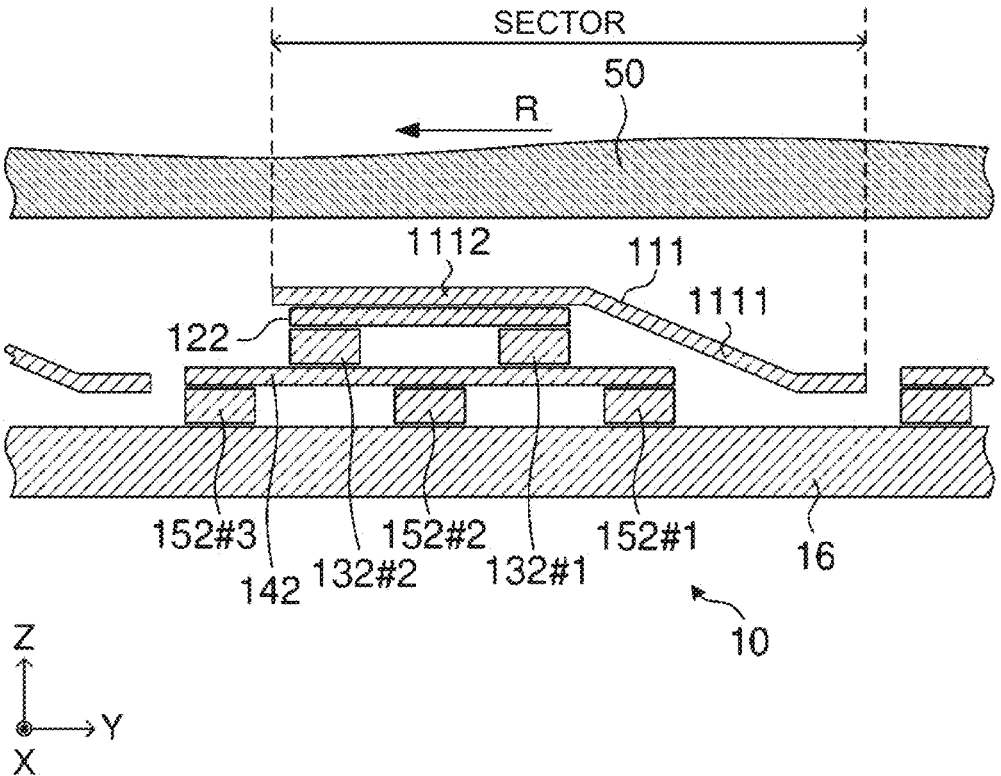
FIG. 3B is a sectional view showing an example of an 3B-3B cross section of the thrust bearing according to the embodiments.

The configuration of the thrust bearing 10 will further be described with reference to FIGS. 3A and 3B. FIG. 3A is a plan view of the thrust bearing 10 that is viewed from the top foil portion 11 side. FIG. 3B is a sectional view taken along line 3B-3B in FIG. 3A. In FIGS. 3A and 3B, arrow R indicates a rotation direction of the rotary member 50. In FIG. 3B, the right side of the drawing is an upstream side in the rotation direction of the rotary member 50, and the left side of the drawing is a downstream side in the rotation direction. In FIG. 3B, each layer and each member are shown on different scales so that they can be recognized on the drawing.

As shown in FIG. 3B, the plate-shaped member 111 includes a tapered portion 1111 and a flat portion 1112. The tapered portion 1111 is inclined so that the distance between the upstream side of the tapered portion 1111 in the rotation direction and the back plate 16 is shorter than the distance between the downstream side of the tapered portion 1111 in the rotation direction and the back plate 16. Since the plate-shaped member 111 extending along the surface of the back plate 16 that faces the rotary member 50 includes the tapered portion 1111, the clearance between the thrust bearing 10 and the rotary member 50 decreases from the upstream side in the rotation direction to the downstream side in the rotation direction. That is, the plate-shaped member 111 and the rotary member 50 define a wedge-shaped flow passage that is tapered from the upstream side in the rotation direction to the downstream side in the rotation direction.

The structure defined by the shape of the plate-shaped member 111 may also be referred to as "top foil structure". One top foil structure that defines one wedge-shaped flow passage may also be referred to as "sector". As described above, the top foil portion 11 includes the six plate-shaped members 111. Therefore, the thrust bearing 10 includes six sectors.

A fluid (e.g., air) between the thrust bearing 10 and the rotary member 50 swirls in the circumferential direction of the thrust bearing 10 as the rotary member 50 rotates. As a result, a dynamic pressure is applied to the plate-shaped members 111 (i.e., the top foil portion 11) in the −Z direction. That is, a pressure for pressing the thrust bearing 10 is generated. The dynamic pressure is mainly applied to the flat portion 1112 of the plate-shaped member 111. Therefore, the flat portion 1112 may also be referred to as "pressure-receiving surface".

The dynamic pressure applied to the plate-shaped member 111 is elastically borne by a backfoil structure defined by the underlay foil portion 12, the support foil portion 13, the pad foil portion 14, the support foil portion 15, and the back plate 16. The backfoil structure provides the thrust bearing 10 with appropriate stiffness and damping performance associated with the operating conditions of the rotary member 50, such as a rotation speed of the rotary member 50. Therefore, the thrust bearing 10 absorbs movement of the rotary member 50 in a direction in which the rotation shaft of the rotary member 50 presses the bearing (i.e., thrust direction: Z-axis direction in FIGS. 3A and 3B) due to at least one of vibration and impact of the rotary member 50. At this time, the clearance between the thrust bearing 10 and the rotary member 50 is an appropriate clearance associated with the operating conditions of the rotary member 50.

The foil thrust bearing 10 bears the dynamic pressure applied to the bearing surface S (i.e., the plate-shaped members 111) by allowing deflection of the bearing surface S defined by the flexible plate-shaped members 111. The thrust bearing 10 has a feature in desirable stability due to the flexibility of the plate-shaped members 111, and can be used as a bearing for a rotary member (e.g., the rotary member 50) that rotates at a relatively high speed. Therefore, the thrust bearing 10 can be applied to devices and apparatuses in which rotary members rotate at high speeds in high-temperature environments, such as turbochargers and micro gas turbines.

As described above, the thrust bearing 10 includes the top foil portion 11 that defines the bearing surface S, and the backfoil structure that elastically bears the dynamic pressure applied to the bearing surface S. Therefore, the top foil portion 11 that defines the bearing surface S may also be referred to as "upper foil portion", and the underlay foil portion 12, the support foil portion 13, the pad foil portion 14, the support foil portion 15, and the back plate 16 that define the backfoil structure may also be referred to as "lower foil portion". In this case, the thrust bearing 10 may include the underlay foil portion 12, the support foil portion 13, the pad foil portion 14, the support foil portion 15, and the back plate 16 as the lower foil portion.

As shown in FIG. 3B, one plate-shaped member 122 of the underlay foil portion 12 is disposed below the flat portion 1112 of the plate-shaped member 111. Two support members 132 #1 and 132 #2 of the support foil portion 13 are disposed below the one plate-shaped member 122. One plate-shaped member 142 of the pad foil portion 14 is disposed below the two support members 132 #1 and 132 #2. Three support members 152 #1, 152 #2, and 152 #3 of the support foil portion 15 are disposed below the one plate-shaped member 142.

The thickness of the plate-shaped member 122 may be larger than the thickness of the plate-shaped member 111 and the thickness of the plate-shaped member 142. In other words, the stiffness of the plate-shaped member 122 may be higher than the stiffness of the plate-shaped members 111 and 142. With this configuration, the planarity of the flat portion 1112 of the plate-shaped member 111 can be maintained even when the dynamic pressure is applied to the plate-shaped member 111.

When the dynamic pressure is applied to the plate-shaped member 111, the force applied to the support member 132 #1 via the plate-shaped member 122 is elastically borne by a double-end supported beam structure defined by part of the plate-shaped member 142 and the support members 152 #1 and 152 #2. That is, the force applied to the support member 132 #1 is borne by an elastic force generated when part of the plate-shaped member 142 is deflected (i.e., elastically deformed).

When the dynamic pressure is applied to the plate-shaped member 111, the force applied to the support member 132 #2 via the plate-shaped member 122 is elastically borne by a double-end supported beam structure defined by the other part of the plate-shaped member 142 and the support members 152 #2 and 152 #3. That is, the force applied to the support member 132 #2 is borne by an elastic force generated when the other part of the plate-shaped member 142 is deflected (i.e., elastically deformed).

Next, the operation of the thrust bearing 10 will be described with reference to FIG. 4. FIG. 4 shows an example of the operation of the thrust bearing 10. In FIG. 4, arrow R indicates the rotation direction of the rotary member 50. FIG. 4 is a sectional view of the thrust bearing taken along line 3B-3B in FIG. 3A. In FIG. 4, dotted arrows indicate movement of a fluid (e.g., air) between the thrust bearing 10 and the rotary member 50.

As shown in FIG. 4, the fluid moves along the circumferential direction of the thrust bearing 10 as the rotary member 50 rotates. At this time, at a portion indicated by dashed circle CI1, the fluid is compressed by the wedge-shaped flow passage defined by the tapered portion 1111 of the plate-shaped member 111 and the rotary member 50. Therefore, the compressed fluid is guided into the clearance between the flat portion 1112 of the plate-shaped member 111 and the rotary member 50. As a result, a fluid film that bears a thrust in the thrust direction of the rotary member 50 is formed in the clearance between the flat portion 1112 and the rotary member 50. Mainly at a portion indicated by dashed circle CI2, the temperature of the fluid (fluid film) increases due to viscous heat generation.

For example, as shown in FIG. 3A, the end of the plate-shaped member 111 on the downstream side in the rotation direction of the rotary member 50 has a chevron shape. Therefore, at a portion indicated by dashed circle CI3 in FIG. 4, turbulence occurs due to the chevron shape. As a result, the fluid having a relatively high temperature by passing through the portion indicated by dashed circle CI2 is mixed with the fluid that has a relatively low temperature and does not pass through the portion indicated by dashed circle CI2.

Technical Effects

When the relative speed between the thrust bearing 10 and the rotary member 50 is relatively high (e.g., when the rotary member 50 is rotating at a relatively high speed), the temperature of the fluid film between the thrust bearing 10 and the rotary member 50 increases due to viscous heat generation. The relatively high temperature of the fluid film may reduce the load capacity of the thrust bearing 10.

As described with reference to FIG. 4, turbulence occurs on the downstream side of the plate-shaped member 111 in the rotation direction in the thrust bearing 10 (see dashed circle CI3 in FIG. 4). Therefore, the fluid having a relatively high temperature by passing through the portion indicated by dashed circle CI2 in FIG. 4 is mixed with the fluid that has a relatively low temperature and does not pass through the portion indicated by dashed circle CI2. That is, the thrust bearing 10 can reduce the temperature of the fluid to be guided into the clearance between the rotary member 50 and the flat portion 1112 of another plate-shaped member 111 on the downstream side of the one plate-shaped member 111 in the rotation direction. As a result, the temperature increase of the fluid film is suppressed in the thrust bearing 10. Thus, the thrust bearing 10 can suppress the decrease in the load capacity.

As described above, the thrust bearing 10 includes the two double-end supported beam structures that are the double-end supported beam structure defined by part of the plate-shaped member 142 and the support members 152 #1 and 152 #2, and the double-end supported beam structure defined by the other part of the plate-shaped member 142 and the support members 152 #2 and 152 #3. That is, in the thrust bearing 10, one plate-shaped member 111 is elastically supported by the two double-end supported beam structures. In other words, the thrust bearing 10 includes two double-end supported beam structures per sector.

The amount of deflection of part of the plate-shaped member 142 when a force is applied to the part of the plate-shaped member 142 can be adjusted by adjusting the distance (i.e., pitch) between the support members 152 #1 and 152 #2. Similarly, the amount of deflection of the other part of the plate-shaped member 142 when a force is applied to the other part of the plate-shaped member 142 can be adjusted by adjusting the distance between the support members 152 #2 and 152 #3. As a result, the degree of freedom of elasticity provided to the backfoil structure can be increased in the thrust bearing 10. Thus, it is possible to provide the backfoil structure with appropriate elasticity associated with the specifications of the device or apparatus to which the thrust bearing 10 is applied.

As described above, the thickness of the plate-shaped member 122 of the underlay foil portion 12 may be larger than the thickness of the plate-shaped member 111 of the top foil portion 11 and the thickness of the plate-shaped member 142 of the pad foil portion 14. With this configuration, the planarity of the flat portion 1112 of the plate-shaped member 111 can be maintained even when the dynamic pressure is applied to the plate-shaped member 111.

Second Embodiment

A thrust bearing according to a second embodiment will be described with reference to FIGS. 5A to 5C. In the second embodiment, description that overlaps the description of the first embodiment will be omitted as appropriate. FIGS. 5A to 5C show various modes of the plate-shaped member (e.g., the plate-shaped member 111) of the top foil portion 11. In FIGS. 5A to 5C, arrow R indicates the rotation direction of the rotary member (e.g., the rotary member 50).

FIG. 5A is a plan view showing one plate-shaped member 111 according to the first embodiment. As shown in FIG. 5A, the end of the plate-shaped member 111 on the downstream side in the rotation direction has the chevron shape. With this chevron shape, turbulence occurs on the downstream side of the plate-shaped member 111 in the rotation direction when the rotary member rotates.

The plate-shaped member of the top foil portion 11 is not limited to the plate-shaped member 111 shown in FIG. 5A as long as it has a structure that causes turbulence when the rotary member rotates.

The plate-shaped member of the top foil portion 11 may be, for example, a plate-shaped member 111a shown in FIG. 5B. A plurality of openings 1113 is formed near the end of the plate-shaped member 111a on the downstream side in the rotation direction. In other words, holes are formed near the end of the plate-shaped member 11a on the downstream side in the rotation direction. The openings 1113 may be formed in the plate-shaped member 111a by punching using a die. The openings 1113 cause turbulence on the downstream side of the plate-shaped member 111a in the rotation direction when the rotary member rotates.

The plate-shaped member of the top foil portion 11 may be, for example, a plate-shaped member 111b shown in FIG. 5C. The roughness of a surface 1114 near the end of the plate-shaped member 111b on the downstream side in the rotation direction is higher than the roughness of the surface of the other part of the plate-shaped member 111b. For example, the roughness of the surface 1114 may be made higher than the roughness of the surface of the other part of the plate-shaped member 111b by at least one of etching, blasting, and shot peening. With the roughness of the surface 1114, turbulence occurs on the downstream side of the plate-shaped member 111b in the rotation direction when the rotary member rotates.

Technical Effects

The plate-shaped members 111, 111a, and 111b can cause turbulence when the rotary member rotates with a relatively simple structure or processing. Therefore, the plate-shaped members 111, 111a, and 111b can suppress the temperature increase of the fluid film. Thus, the plate-shaped members 111, 111a, and 111b can suppress the decrease in the load capacity of the thrust bearing 10.

Third Embodiment

A thrust bearing according to a third embodiment will be described with reference to FIGS. 6A to 6H. In the third embodiment, description that overlaps the description of the first embodiment will be omitted as appropriate. FIGS. 6A to 6H show various modes of connection between the annular member 121 and the plate-shaped member 122 of the underlay foil portion 12.

Figures 6A, 6B, 6C, 6D, 6E, 6F, 6G, 6H:
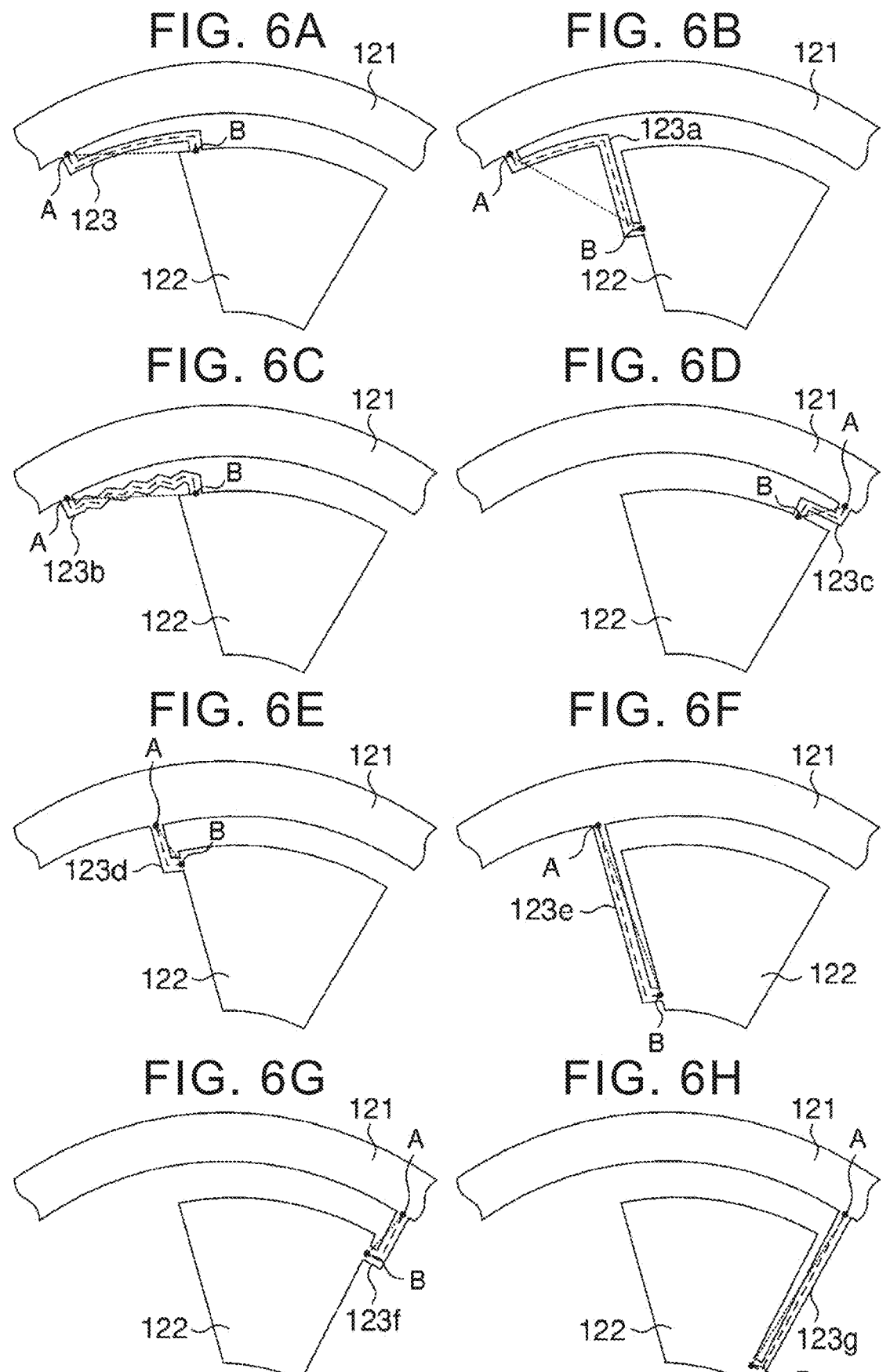
FIG. 6A shows one mode of connection between an annular member and a plate-shaped member of an underlay foil portion according to the embodiments.
FIG. 6B shows another mode of the connection between the annular member and the plate-shaped member of the underlay foil portion according to the embodiments.
FIG. 6C shows another mode of the connection between the annular member and the plate-shaped member of the underlay foil portion according to the embodiments.
FIG. 6D shows another mode of the connection between the annular member and the plate-shaped member of the underlay foil portion according to the embodiments.
FIG. 6E shows another mode of the connection between the annular member and the plate-shaped member of the underlay foil portion according to the embodiments.
FIG. 6F shows another mode of the connection between the annular member and the plate-shaped member of the underlay foil portion according to the embodiments.
FIG. 6G shows another mode of the connection between the annular member and the plate-shaped member of the underlay foil portion according to the embodiments.
FIG. 6H shows another mode of the connection between the annular member and the plate-shaped member of the underlay foil portion according to the embodiments.

As shown in FIG. 6A, the annular member 121 and the plate-shaped member 122 may be connected by a connection member 123. The annular member 121 and the connection member 123 are connected at a connection point A. The plate-shaped member 122 and the connection member 123 are connected at a connection point B. The connection member 123 is formed so that the length along the shape of the connection member 123 from the connection point A to the connection point B (i.e., the length of the dashed line in FIG. 6A) is larger than the length of a straight line connecting the connection point A and the connection point B (the length of the dotted line in FIG. 6A).

As shown in FIG. 6B, the annular member 121 and the plate-shaped member 122 may be connected by a connection member 123a. The annular member 121 and the connection member 123a are connected at a connection point A. The plate-shaped member 122 and the connection member 123a are connected at a connection point B. The connection member 123a is formed so that the length along the shape of the connection member 123a from the connection point A to the connection point B (i.e., the length of the dashed line in FIG. 6B) is larger than the length of a straight line connecting the connection point A and the connection point B (the length of the dotted line in FIG. 6B).

As shown in FIG. 6C, the annular member 121 and the plate-shaped member 122 may be connected by a connection member 123b. The annular member 121 and the connection member 123b are connected at a connection point A. The plate-shaped member 122 and the connection member 123b are connected at a connection point B. The connection member 123b is formed so that the length along the shape of the connection member 123b from the connection point A to the connection point B (i.e., the length of the dashed line in FIG. 6C) is larger than the length of a straight line connecting the connection point A and the connection point B (the length of the dotted line in FIG. 6C).

As shown in FIG. 6D, the annular member 121 and the plate-shaped member 122 may be connected by a connection member 123c. The annular member 121 and the connection member 123c are connected at a connection point A. The plate-shaped member 122 and the connection member 123c are connected at a connection point B. The connection member 123c is formed so that the length along the shape of the connection member 123c from the connection point A to the connection point B (i.e., the length of the dashed line in FIG. 6D) is larger than the length of a straight line connecting the connection point A and the connection point B (the length of the dotted line in FIG. 6D).

As shown in FIG. 6E, the annular member 121 and the plate-shaped member 122 may be connected by a connection member 123d. The annular member 121 and the connection member 123d are connected at a connection point A. The plate-shaped member 122 and the connection member 123d are connected at a connection point B. The connection member 123*d* is formed so that the length along the shape of the connection member 123*d* from the connection point A to the connection point B (i.e., the length of the dashed line in FIG. 6E) is larger than the length of a straight line connecting the connection point A and the connection point B (the length of the dotted line in FIG. 6E).

As shown in FIG. 6F, the annular member 121 and the plate-shaped member 122 may be connected by a connection member 123*e*. The annular member 121 and the connection member 123*e* are connected at a connection point A. The plate-shaped member 122 and the connection member 123*e* are connected at a connection point B. The connection member 123*e* is formed so that the length along the shape of the connection member 123*e* from the connection point A to the connection point B (i.e., the length of the dashed line in FIG. 6F) is larger than the length of a straight line connecting the connection point A and the connection point B (the length of the dotted line in FIG. 6F).

As shown in FIG. 6G, the annular member 121 and the plate-shaped member 122 may be connected by a connection member 123*f*. The annular member 121 and the connection member 123*f* are connected at a connection point A. The plate-shaped member 122 and the connection member 123*f* are connected at a connection point B. The connection member 123*f* is formed so that the length along the shape of the connection member 123*f* from the connection point A to the connection point B (i.e., the length of the dashed line in FIG. 6G) is larger than the length of a straight line connecting the connection point A and the connection point B (the length of the dotted line in FIG. 6G).

As shown in FIG. 6H, the annular member 121 and the plate-shaped member 122 may be connected by a connection member 123*g*. The annular member 121 and the connection member 123*g* are connected at a connection point A. The plate-shaped member 122 and the connection member 123*g* are connected at a connection point B. The connection member 123*g* is formed so that the length along the shape of the connection member 123*g* from the connection point A to the connection point B (i.e., the length of the dashed line in FIG. 6H) is larger than the length of a straight line connecting the connection point A and the connection point B (the length of the dotted line in FIG. 6H).

Technical Effects

When the dynamic pressure generated along with the rotation of the rotary member (e.g., the rotary member 50) is applied to the top foil portion 11 (e.g., the plate-shaped member 111) and there is a difference in stiffness between the outer peripheral side of the plate-shaped member 122 (i.e., the annular member 121 side) and the inner peripheral side of the plate-shaped member 122, the load capacity of the thrust bearing 10 decreases.

The connection member is formed so that the length along the shape of the connection member from the connection point A to the connection point B is larger than the length of the straight line connecting the connection point A and the connection point B. Therefore, the occurrence of the difference in stiffness between the outer peripheral side of the plate-shaped member 122 and the inner peripheral side of the plate-shaped member 122 can be suppressed. Thus, it is not necessary to, for example, vary the thickness of the plate-shaped member 122 within the plate-shaped member 122 to suppress the occurrence of the difference in stiffness. As a result, the planarity of the plate-shaped member 122 can be maintained, for example, even when the dynamic pressure is applied to the top foil portion 11. Accordingly, the connection members 123, 123*a*, 123*b*, 123*c*, 123*d*, 123*e*, 123*f*, and 123*g* can improve the load capacity of the thrust bearing 10.

Fourth Embodiment

A thrust bearing according to a fourth embodiment will be described with reference to FIGS. 7A to 7D. In the fourth embodiment, description that overlaps the description of the first embodiment will be omitted as appropriate. FIGS. 7A to 7D show various modes of connection between the annular member 131 and the support members 132 of the support foil portion 13.

Figure 7A:
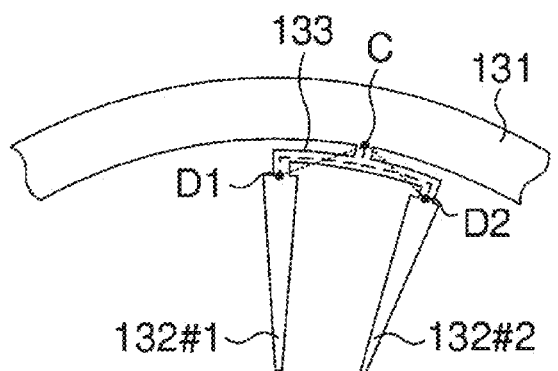
FIG. 7A shows one mode of connection between an annular member and support members of a support foil portion according to the embodiments.

As shown in FIG. 7A, the annular member 131 and each of the support members 132 #1 and 132 #2 may be connected by a connection member 133. The annular member 131 and the connection member 133 are connected at a connection point C. The support member 132 #1 and the connection member 133 are connected at a connection point D1. The support member 132 #2 and the connection member 133 are connected at a connection point D2. The connection member 133 is formed so that the length along the shape of the connection member 133 from the connection point C to the connection point D1 (i.e., the length of the dashed line in FIG. 7A) is larger than the length of a straight line connecting the connection point C and the connection point D1 (the length of the dotted line in FIG. 7A). The connection member 133 is formed so that the length along the shape of the connection member 133 from the connection point C to the connection point D2 (i.e., the length of the dashed line in FIG. 7A) is larger than the length of a straight line connecting the connection point C and the connection point D2 (the length of the dotted line in FIG. 7A).

Figure 7B:
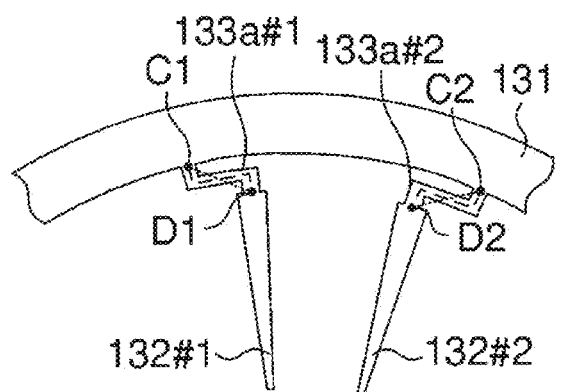
FIG. 7B shows another mode of the connection between the annular member and the support members of the support foil portion according to the embodiments.

As shown in FIG. 7B, the annular member 131 and the support member 132 #1 may be connected by a connection member 133*a* #1. The annular member 131 and the support member 132 #2 may be connected by a connection member 133*a* #2. The annular member 131 and the connection member 133*a* #1 are connected at a connection point C1. The support member 132 #1 and the connection member 133*a* #1 are connected at a connection point D1. The annular member 131 and the connection member 133*a* #2 are connected at a connection point C2. The support member 132 #2 and the connection member 133*a* #2 are connected at a connection point D2. The connection member 133*a* #1 is formed so that the length along the shape of the connection member 133*a* #1 from the connection point C1 to the connection point D1 (i.e., the length of the dashed line in FIG. 7B) is larger than the length of a straight line connecting the connection point C1 and the connection point D1 (the length of the dotted line in FIG. 7B). The connection member 133*a* #2 is formed so that the length along the shape of the connection member 133*a* #2 from the connection point C2 to the connection point D2 (i.e., the length of the dashed line in FIG. 7B) is larger than the length of a straight line connecting the connection point C2 and the connection point D2 (the length of the dotted line in FIG. 7B).

Figure 7C:
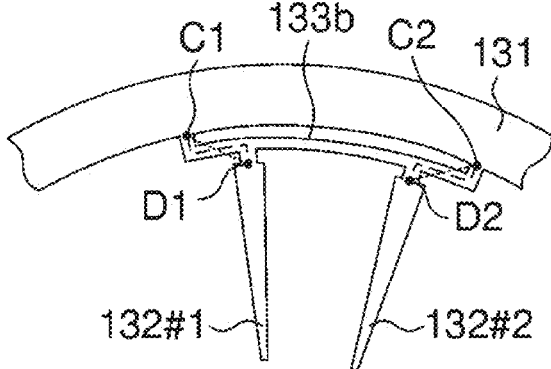
FIG. 7C shows another mode of the connection between the annular member and the support members of the support foil portion according to the embodiments.

As shown in FIG. 7C, the annular member 131 and each of the support members 132 #1 and 132 #2 may be connected by a connection member 133*b*. The annular member 131 and the connection member 133*b* are connected at connection points C1 and C2. The support member 132 #1 and the connection member 133*b* are connected at a connection point D1. The support member 132 #2 and the connection member 133*b* are connected at a connection point D2. The connection member 133*b* is formed so that the length along the shape of the connection member 133*b* from the connection point C1 to the connection point D1 (i.e., the length of the dashed line in FIG. 7C) is larger than the length of a straight line connecting the connection point C1 and the connection point D1 (the length of the dotted line in FIG. 7C). The connection member 133*b* is formed so that the length along the shape of the connection member 133*b* from the connection point C2 to the connection point D2 (i.e., the length of the dashed line in FIG. 7C) is larger than the length of a straight line connecting the connection point C2 and the connection point D2 (the length of the dotted line in FIG. 7C).

Figure 7D:
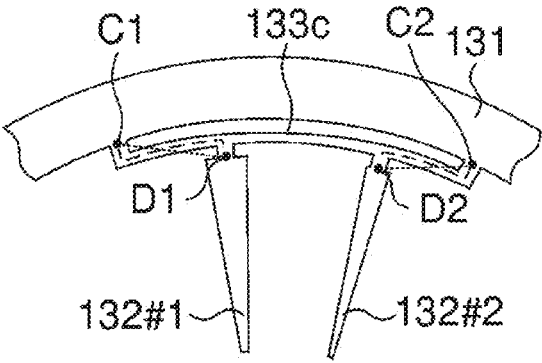
FIG. 7D shows another mode of the connection between the annular member and the support members of the support foil portion according to the embodiments.

As shown in FIG. 7D, the annular member 131 and each of the support members 132 #1 and 132 #2 may be connected by a connection member 133*c*. The annular member 131 and the connection member 133*c* are connected at connection points C1 and C2. The support member 132 #1 and the connection member 133*c* are connected at a connection point D1. The support member 132 #2 and the connection member 133*c* are connected at a connection point D2. The connection member 133*c* is formed so that the length along the shape of the connection member 133*c* from the connection point C1 to the connection point D1 (i.e., the length of the dashed line in FIG. 7D) is larger than the length of a straight line connecting the connection point C1 and the connection point D1 (the length of the dotted line in FIG. 7D). The connection member 133*c* is formed so that the length along the shape of the connection member 133*c* from the connection point C2 to the connection point D2 (i.e., the length of the dashed line in FIG. 7D) is larger than the length of a straight line connecting the connection point C2 and the connection point D2 (the length of the dotted line in FIG. 7D).

Technical Effects

When the dynamic pressure generated along with the rotation of the rotary member (e.g., the rotary member 50) is applied to the top foil portion 11 (e.g., the plate-shaped member 111) and there is a difference in stiffness between the outer peripheral side of the support member 132 (i.e., the annular member 131 side) and the inner peripheral side of the support member 132, the load capacity of the thrust bearing 10 decreases.

The connection member is formed so that the length along the shape of the connection member from the connection point C or C1 to the connection point D1 is larger than the length of the straight line connecting the connection point C or C1 and the connection point D1. Therefore, the occurrence of the difference in stiffness between the outer peripheral side of the support member 132 #1 and the inner peripheral side of the support member 132 #1 can be suppressed. Similarly, the connection member is formed so that the length along the shape of the connection member from the connection point C or C2 to the connection point D2 is larger than the length of the straight line connecting the connection point C or C2 and the connection point D2. Therefore, the occurrence of the difference in stiffness between the outer peripheral side of the support member 132 #2 and the inner peripheral side of the support member 132 #2 can be suppressed. As a result, the planarity of the support members 132 #1 and 132 #2 can be maintained, for example, even when the dynamic pressure is applied to the top foil portion 11. Accordingly, the connection members 133, 133*a*, 133*b*, and 133*c* can improve the load capacity of the thrust bearing 10.

Fifth Embodiment

A thrust bearing according to a fifth embodiment will be described with reference to FIGS. 8A to 8C. In the fifth embodiment, description that overlaps the description of the first embodiment will be omitted as appropriate. FIGS. 8A to 8C show various modes of the backfoil structure. FIGS. 8A to 8C are sectional views corresponding to the sectional view taken along line 3B-3B in FIG. 3A.

Figure 8A:
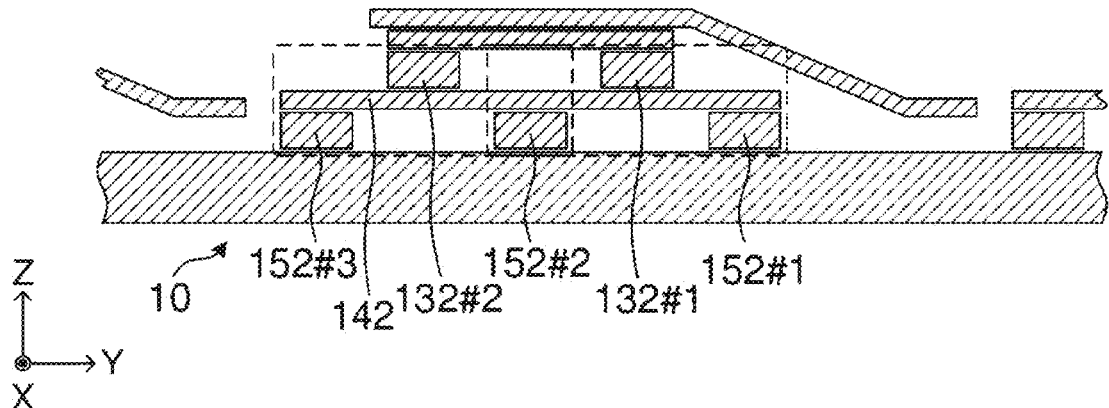
FIG. 8A shows one mode of a backfoil structure according to the embodiments.

As shown in FIG. 8A, the thrust bearing 10 may include two double-end supported beam structures that are the double-end supported beam structure defined by part of the plate-shaped member 142 and the support members 152 #1 and 152 #2, and the double-end supported beam structure defined by the other part of the plate-shaped member 142 and the support members 152 #2 and 152 #3.

Figure 8B:
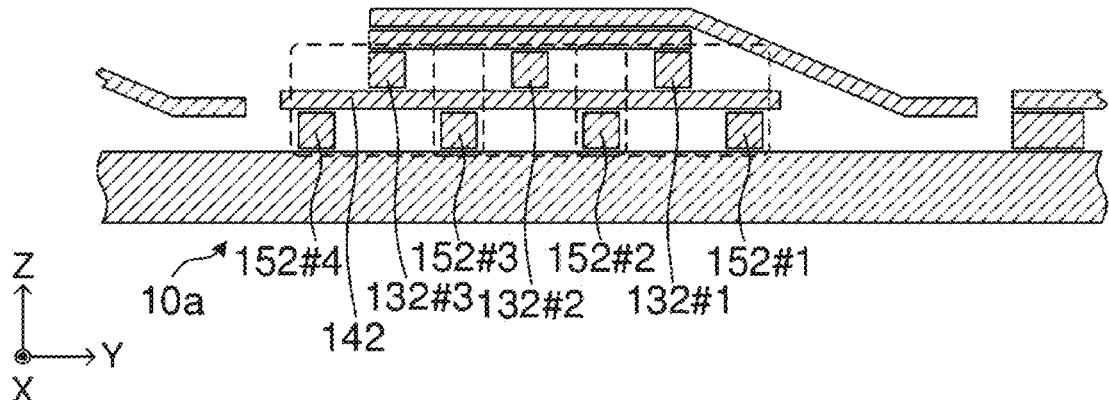
FIG. 8B shows another mode of the backfoil structure according to the embodiments.

As shown in FIG. 8B, a thrust bearing 10*a* may include three double-end supported beam structures that are a double-end supported beam structure defined by part of the plate-shaped member 142 and the support members 152 #1 and 152 #2, a double-end supported beam structure defined by another part of the plate-shaped member 142 and the support members 152 #2 and 152 #3, and a double-end supported beam structure defined by the other part of the plate-shaped member 142 and the support members 152 #3 and 152 #4.

A thrust bearing 10*b* shown in FIG. 8C may include an additional pad foil portion disposed below the support foil portion 15 and including a plate-shaped member 242 corresponding to the plate-shaped member 142, and an additional support foil portion disposed below the additional pad foil portion and including support members 252 #1, 252 #2, 252 #3, and 252 #4 corresponding to the support members 152.

Figure 8C:
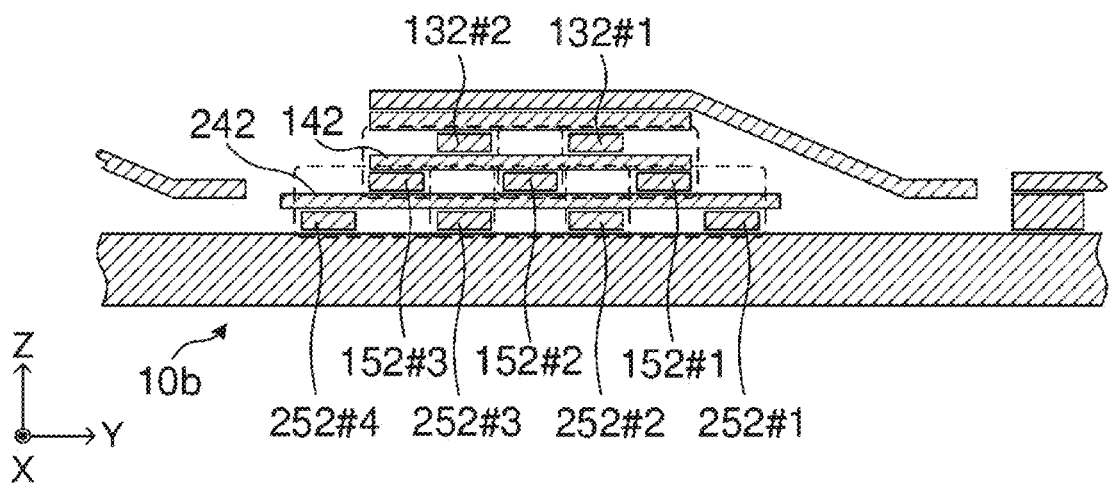
FIG. 8C shows another mode of the backfoil structure according to the embodiments.

As shown in FIG. 8C, the thrust bearing 10*b* may include five double-end supported beam structures that are a double-end supported beam structure defined by part of the plate-shaped member 142 and the support members 152 #1 and 152 #2, a double-end supported beam structure defined by the other part of the plate-shaped member 142 and the support members 152 #2 and 152 #3, a double-end supported beam structure defined by part of the plate-shaped member 242 and the support members 252 #1 and 252 #2, a double-end supported beam structure defined by another part of the plate-shaped member 242 and the support members 252 #2 and 252 #3, and a double-end supported beam structure defined by the other part of the plate-shaped member 242 and the support members 252 #3 and 252 #4.

Technical Effects

As shown in FIGS. 8A to 8C, the thrust bearings 10, 10*a*, and 10*b* may include two or more double-end supported beam structures per sector. With this configuration, the degree of freedom of elasticity provided to the backfoil structure can be increased. For example, when applied to a relatively large-sized rotary device, the thrust bearing can also be upsized. Therefore, the number of double-end supported beam structures per sector can be increased relatively easily. Thus, the degree of freedom of elasticity provided to the backfoil structure can be increased as the thrust bearing is upsized.

Sixth Embodiment

Figure 9A:
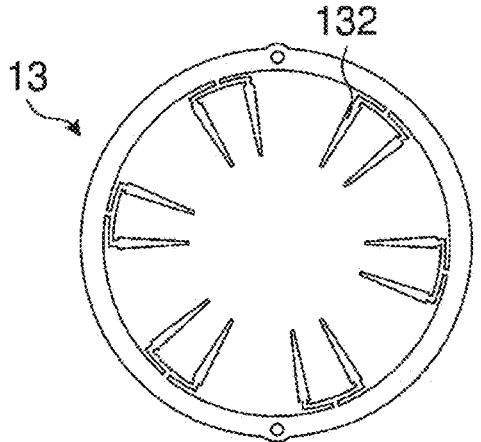
FIG. 9A illustrates an example of the shapes of the support members of the support foil portion according to the embodiments.
Figure 9B:
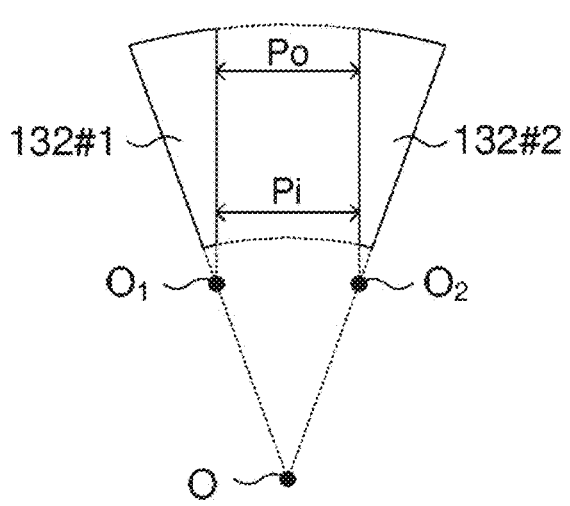
FIG. 9B illustrates the example of the shapes of the support members of the support foil portion according to the embodiments.
Figure 9C:
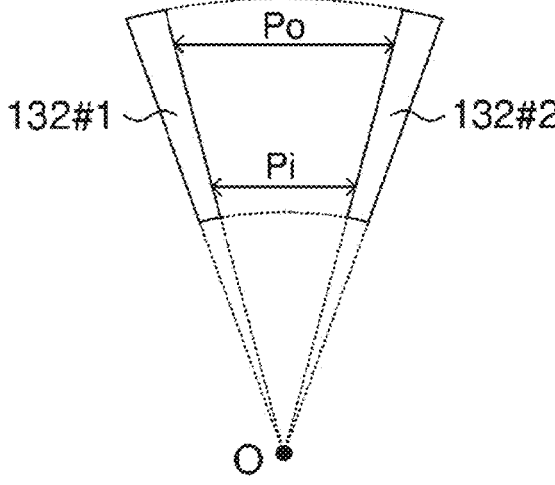
FIG. 9C illustrates the example of the shapes of the support members of the support foil portion according to the embodiments.

A thrust bearing according to a sixth embodiment will be described with reference to FIGS. 9A to 9C. In the sixth embodiment, description that overlaps the description of the first embodiment will be omitted as appropriate. FIGS. 9A to 9C illustrate the shapes of the support members 132 of the support foil portion 13.

FIG. 9B is a plan view showing one set of support members 132 #1 and 132 #2 of the support foil portion 13 shown in FIG. 9A. In FIG. 9B, a point O indicates the center of the support foil portion 13 (i.e., the center of the rotation shaft of the rotary member).

In FIG. 9B, the support member 132 #1 may have a sector shape about a point $O_1$. The support member 132 #2 may have a sector shape about a point $O_2$. The points $O_1$ and $O_2$ may be points on a circumference of a circle about the point O.

Technical Effects

If each of the support members 132 #1 and 132 #2 has a sector shape about the point O, the distance (i.e., pitch) between the support members 132 #1 and 132 #2 increases toward the outer peripheral side of the support members 132 #1 and 132 #2 as shown in FIG. 9C (see symbols "Pi" and "Po" in FIG. 9C). In the backfoil structure, the stiffness of the inner peripheral side where the distance between the support members 132 #1 and 132 #2 is relatively short is higher than the stiffness of the outer peripheral side where the distance between the support members 132 #1 and 132 #2 is relatively long. Due to the difference in stiffness between the inner peripheral side of the support members 132 #1 and 132 #2 and the outer peripheral side of the support members 132 #1 and 132 #2, the flatness of the flat portion 1112 of the top foil portion 11 decreases. As a result, the load capacity of the thrust bearing 10 decreases.

When the support member 132 #1 has the sector shape about the point $O_1$ and the support member 132 #2 has the sector shape about the point $O_2$ as shown in FIG. 9B, the distance Pi on the inner peripheral side between the support members 132 #1 and 132 #2 and the distance Po on the outer peripheral side between the support members 132 #1 and 132 #2 can be made closer (typically equal) to each other. As a result, it is possible to suppress the occurrence of the difference in stiffness between the inner peripheral side of the support members 132 #1 and 132 #2 and the outer peripheral side of the support members 132 #1 and 132 #2. Thus, the support members 132 #1 and 132 #2 shown in FIG. 9B can suppress the decrease in the load capacity of the thrust bearing 10.

Seventh Embodiment

Figure 10A:
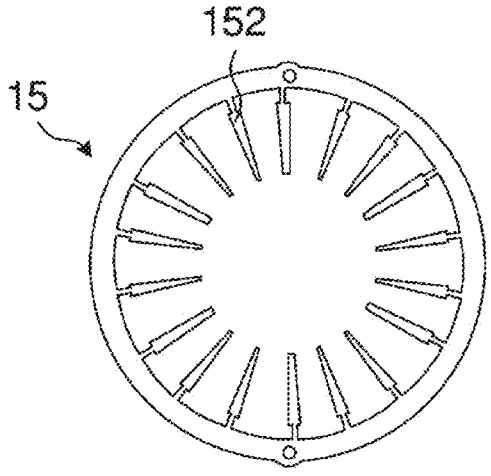
FIG. 10A illustrates another example of the shapes of the support members of the support foil portion according to the embodiments.
Figure 10B:
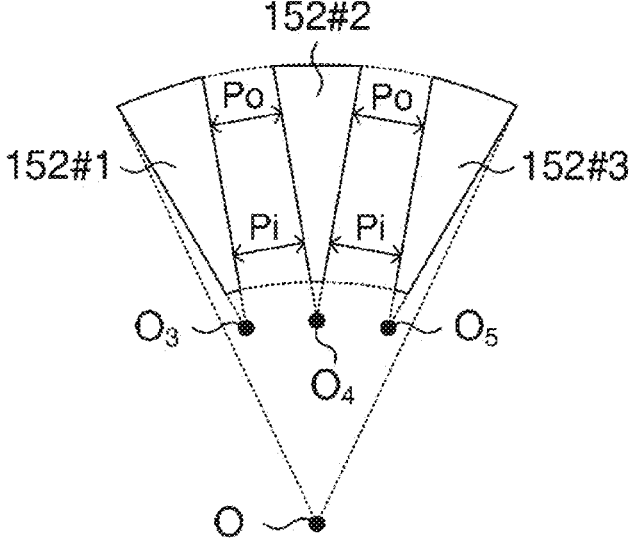
FIG. 10B illustrates the other example of the shapes of the support members of the support foil portion according to the embodiments.

A thrust bearing according to a seventh embodiment will be described with reference to FIGS. 10A and 10B. In the seventh embodiment, description that overlaps the description of the first embodiment will be omitted as appropriate. FIGS. 10A and 10B illustrate the shapes of the support members 152 of the support foil portion 15.

FIG. 10B is a plan view showing one set of support members 152 #1, 152 #2, and 152 #3 of the support foil portion 15 shown in FIG. 10A. In FIG. 10B, a point O indicates the center of the support foil portion 15 (i.e., the center of the rotation shaft of the rotary member).

In FIG. 10B, the support member 152 #1 may have a sector shape about a point $O_3$. The support member 152 #2 may have a sector shape about a point $O_4$. The support member 152 #3 may have a sector shape about a point $O_5$. The points $O_3$, $O_4$, and $O_5$ may be points on a circumference of a circle about the point O.

Technical Effects

If each of the support members 152 #1, 152 #2, and 152 #3 has a sector shape about the point O, the distance (i.e., pitch) between the support members 152 #1 and 152 #2 increases toward the outer peripheral side of the support members 152 #1 and 152 #2 (see, for example, FIG. 9C). Similarly, the distance between the support members 152 #2 and 152 #3 increases toward the outer peripheral side of the support members 152 #2 and 152 #3. In the backfoil structure, the stiffness of the inner peripheral side where the distance between the two support members 152 is relatively short is higher than the stiffness of the outer peripheral side where the distance between the two support members 152 is relatively long. Due to the difference in stiffness between the inner peripheral side and the outer peripheral side of the support members 152, the flatness of the flat portion 1112 of the top foil portion 11 decreases. As a result, the load capacity of the thrust bearing 10 decreases.

When the support member 152 #1 has the sector shape about the point $O_3$, the support member 152 #2 has the sector shape about the point $O_4$, and the support member 152 #3 has the sector shape about the point $O_5$ as shown in FIG. 10B, the distance Pi on the inner peripheral side between the two support members 152 and the distance Po on the outer peripheral side between the two support members 152 can be made closer (typically equal) to each other. As a result, it is possible to suppress the occurrence of the difference in stiffness between the inner peripheral side and the outer peripheral side of the support members 152. Thus, the support members 152 #1, 152 #2, and 152 #3 shown in FIG. 10B can suppress the decrease in the load capacity of the thrust bearing 10.

Eighth Embodiment

Figure 11A:
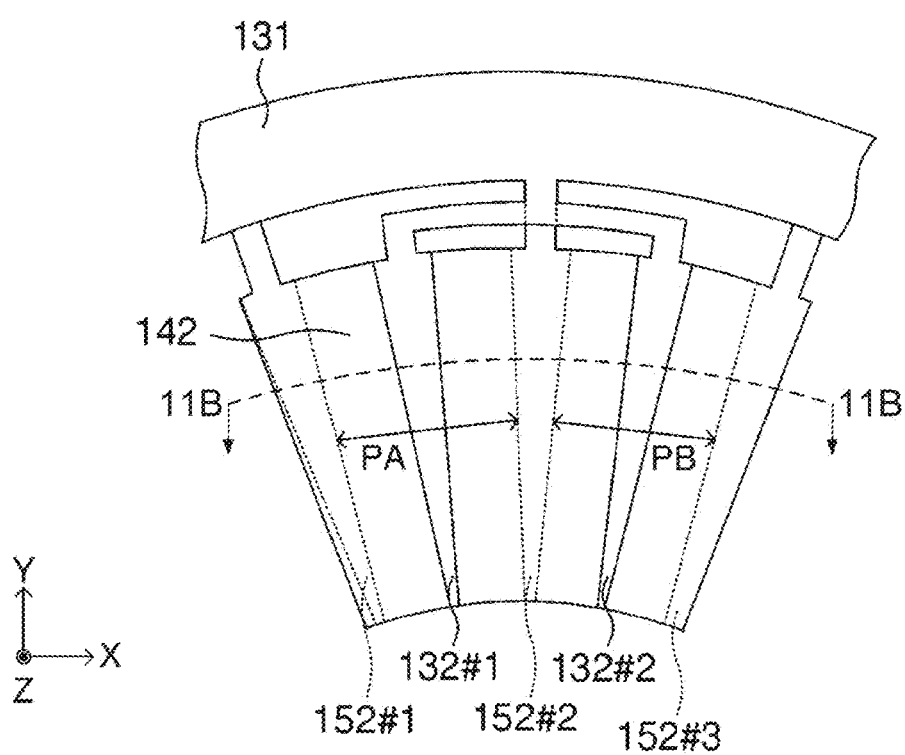
FIG. 11A is a plan view of part of the thrust bearing according to the embodiments that is viewed from the top foil portion side.
Figure 11B:
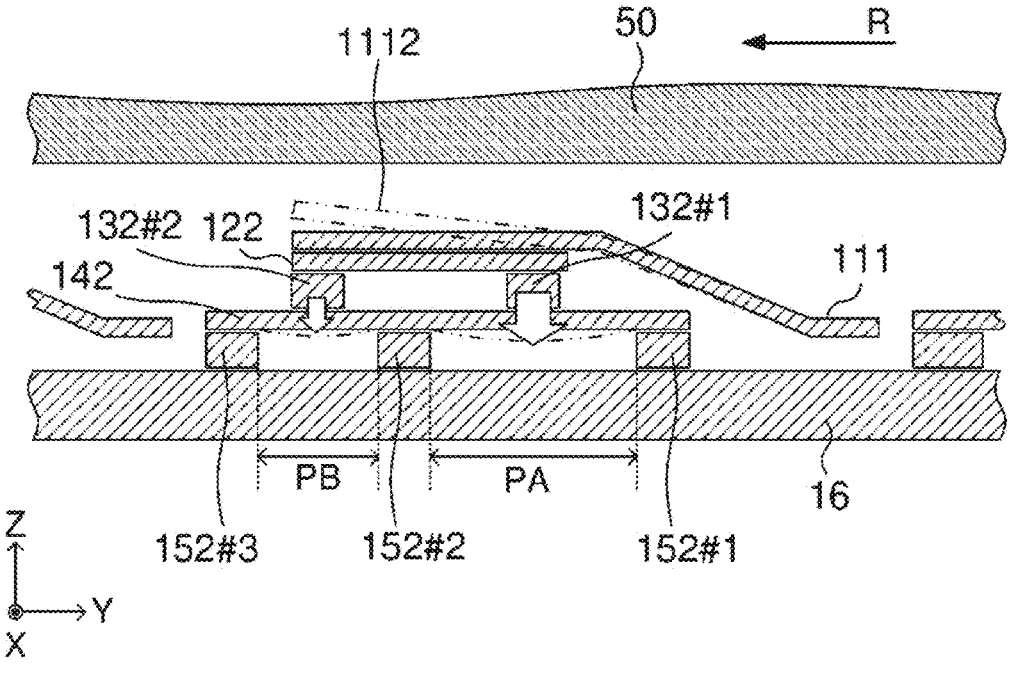
FIG. 11B is a sectional view showing another example of the cross section of the thrust bearing according to the embodiments.

A thrust bearing according to an eighth embodiment will be described with reference to FIGS. 11A and 11B. In the eighth embodiment, description that overlaps the description of the first embodiment will be omitted as appropriate. FIG. 11A is a plan view of part of the thrust bearing 10 that is viewed from the top foil portion 11 side. FIG. 11B is a sectional view taken along line 11B-11B in FIG. 11A. In FIG. 11B, arrow R indicates the rotation direction of the rotary member 50. In FIG. 11B, each layer and each member are shown on different scales so that they can be recognized on the drawing.

As described in the first embodiment, the amount of deflection of part of the plate-shaped member 142 when a force is applied to the part of the plate-shaped member 142 can be adjusted by adjusting the distance (pitch PA in FIGS. 11A and 11B) between the support members 152 #1 and 152 #2. Similarly, the amount of deflection of the other part of the plate-shaped member 142 when a force is applied to the other part of the plate-shaped member 142 can be adjusted by adjusting the distance (pitch PB in FIGS. 11A and 11B) between the support members 152 #2 and 152 #3.

For example, when the pitch PA is larger than the pitch PB as shown in FIG. 11B, the amount of deflection of the part of the plate-shaped member 142 when a force is applied to the part of the plate-shaped member 142 is larger than the amount of deflection of the other part of the plate-shaped member 142 when the same force as that applied to the part of the plate-shaped member 142 is applied to the other part of the plate-shaped member 142. That is, when the pitch PA is larger than the pitch PB, the stiffness of the backfoil structure on the upstream side in the rotation direction is lower than the stiffness of the backfoil structure on the downstream side in the rotation direction. In other words, when the pitch PA is larger than the pitch PB, the stiffness of the backfoil structure on the downstream side in the rotation direction is higher than the stiffness of the backfoil structure on the upstream side in the rotation direction. As a result, when the dynamic pressure generated along with the rotation of the rotary member 50 is applied to the plate-shaped member 111 of the top foil portion 11, the flat portion 1112 of the plate-shaped member 111 is inclined so that the upstream side of the flat portion 1112 in the rotation direction is closer to the back plate 16 than the downstream side of the flat portion 1112 in the rotation direction as indicated by the long dashed double-short dashed line in FIG. 11B.

As the pitch PA becomes even larger than the pitch PB, the stiffness of the backfoil structure on the upstream side in the rotation direction becomes even lower than the stiffness of the backfoil structure on the downstream side in the rotation direction, and the difference between the stiffness of the backfoil structure on the upstream side in the rotation direction and the stiffness of the backfoil structure on the downstream side in the rotation direction increases. As the pitch PA approaches the pitch PB from a state in which the pitch PA is smaller than the pitch PB, the difference between the stiffness of the backfoil structure on the upstream side in the rotation direction and the stiffness of the backfoil structure on the downstream side in the rotation direction decreases. As the difference between the stiffness of the backfoil structure on the upstream side in the rotation direction and the stiffness of the backfoil structure on the downstream side in the rotation direction decreases, the degree of inclination of the flat portion 1112 decreases.

Technical Effects

According to research conducted by the inventors of the present disclosure, the optimal shape of the clearance between the plate-shaped member 111 and the rotary member 50 (i.e., the optimal wedge shape of the flow passage) varies depending on the rated rotation speed of the rotary member 50 (i.e., design rotation speed). Specifically, when the rated rotation speed of the rotary member 50 is relatively low, the flat portion 1112 of the plate-shaped member 111 is desirably inclined so that the upstream side of the flat portion 1112 in the rotation direction is closer to the back plate 16 than the downstream side of the flat portion 1112 in the rotation direction as indicated by the long dashed double-short dashed line in FIG. 11B. When the rated rotation speed of the rotary member 50 is relatively high, the flat portion 1112 desirably extends, for example, along the surface of the back plate 16 that faces the rotary member 50 (i.e., the degree of inclination of the flat portion 1112 is desirably low).

As described above, the stiffness of the backfoil structure on each of the upstream side in the rotation direction and the downstream side in the rotation direction can be changed by changing the pitch PA and the pitch PB. For example, when the pitch PA is set larger than the pitch PB, the shape of the clearance between the plate-shaped member 111 and the rotary member 50 can be suited to the case where the rated rotation speed of the rotary member 50 is relatively low. For example, when the pitch PA is set equal to the pitch PB, the shape of the clearance between the plate-shaped member 111 and the rotary member 50 can be suited to the case where the rated rotation speed of the rotary member 50 is relatively high.

According to the present embodiment, the shape of the clearance between the plate-shaped member 111 and the rotary member 50 (i.e., the wedge shape of the flow passage) can be adjusted relatively easily by changing the pitch PA and the pitch PB. As a result, the shape of the clearance between the plate-shaped member 111 and the rotary member 50 can be made optimal for the rated rotation speed of the rotary member 50.

Ninth Embodiment

Figure 12A:
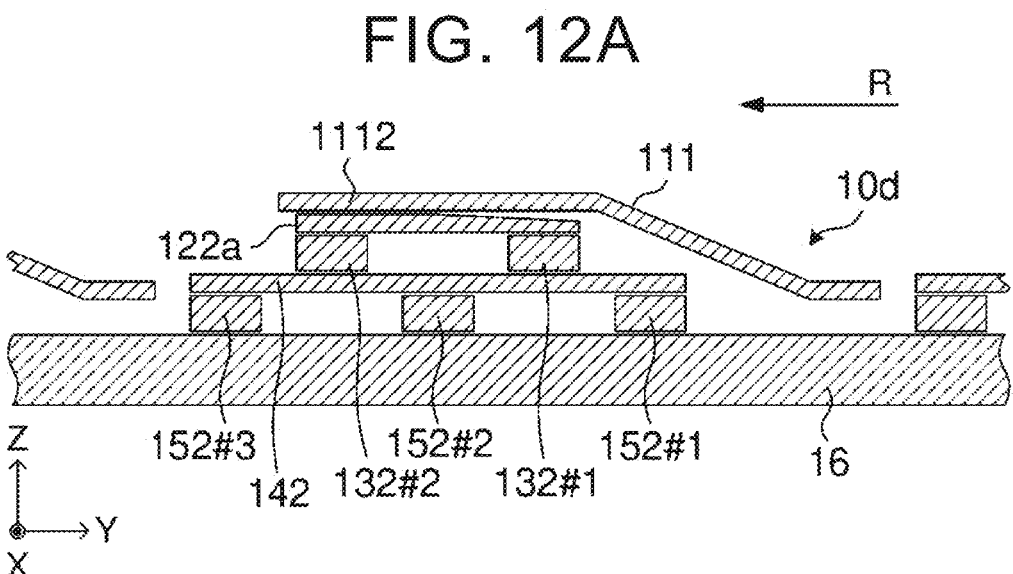
FIG. 12A shows one mode of the backfoil structure according to the embodiments.
Figure 12B:
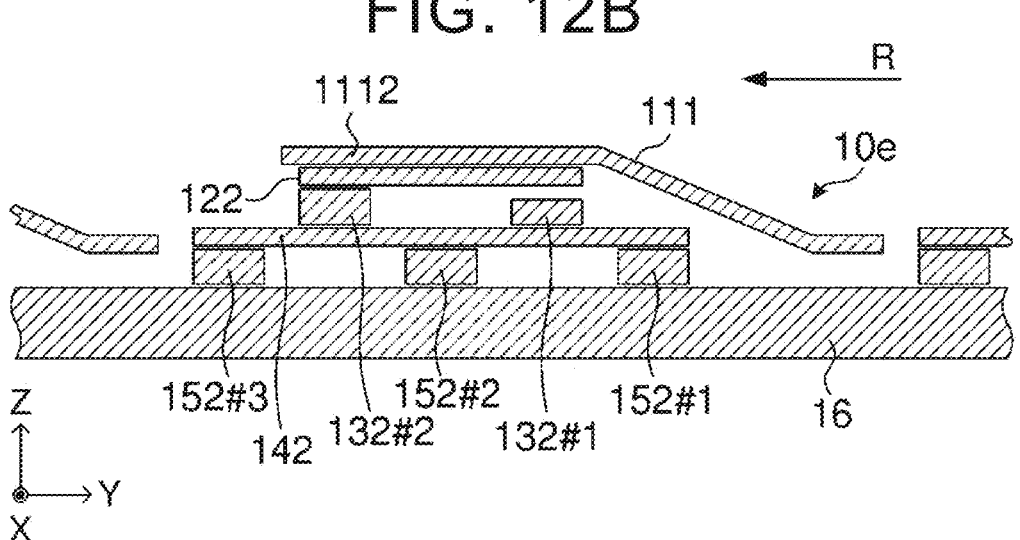
FIG. 12B shows another mode of the backfoil structure according to the embodiments.
Figure 12C:
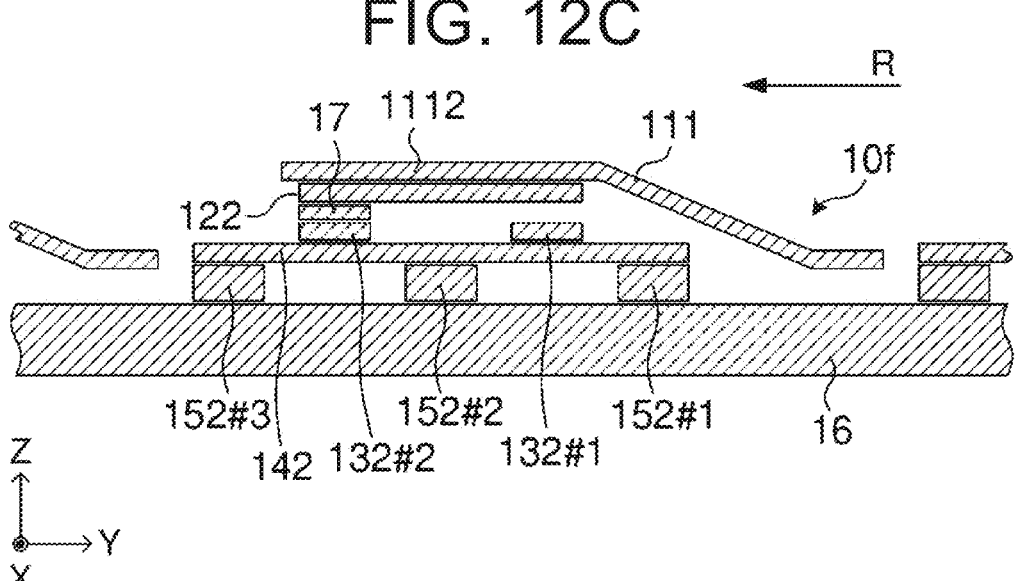
FIG. 12C shows another mode of the backfoil structure according to the embodiments.

A thrust bearing according to a ninth embodiment will be described with reference to FIGS. 12A to 12C. In the ninth embodiment, description that overlaps the description of the first embodiment will be omitted as appropriate. FIGS. 12A to 12C show various modes of the backfoil structure. In FIGS. 12A to 12C, arrow R indicates the rotation direction of the rotary member (e.g., the rotary member 50). FIGS. 12A to 12C are sectional views corresponding to the sectional view taken along line 3B-3B in FIG. 3A, each layer and each member are shown on different scales so that they can be recognized on the drawings.

In the eighth embodiment, the shape of the clearance between the plate-shaped member 111 and the rotary member 50 can be adjusted by adjusting the pitch PA (i.e., the distance between the support members 152 #1 and 152 #2) and the pitch PB (the distance between the support members 152 #2 and 152 #3).

In the ninth embodiment, the shape of the clearance between the plate-shaped member 111 and the rotary member 50 is adjusted by adjusting the members that define the backfoil structure. As shown in FIG. 12A, a thrust bearing 10d may include a plate-shaped member 122a having a thickness on the upstream side in the rotation direction smaller than the thickness on the downstream side in the rotation direction. When the dynamic pressure generated along with the rotation of the rotary member is applied to the plate-shaped member 111 of the top foil portion 11, the upstream side of the flat portion 1112 of the plate-shaped member 111 in the rotation direction is pressed toward the back plate 16 compared to the downstream side of the flat portion 1112 in the rotation direction due to the difference between the thickness of the plate-shaped member 122a on the upstream side in the rotation direction and the thickness of the plate-shaped member 122a on the downstream side in the rotation direction.

As shown in FIG. 12B, in a thrust bearing 10e, the thickness of the support member 132 #1 disposed on the upstream side in the rotation direction may be smaller than the thickness of the support member 132 #2 disposed on the downstream side in the rotation direction. When the dynamic pressure generated along with the rotation of the rotary member is applied to the plate-shaped member 111 of the top foil portion 11, the upstream side of the flat portion 1112 of the plate-shaped member 111 in the rotation direction is pressed toward the back plate 16 compared to the downstream side of the flat portion 1112 in the rotation direction due to the difference in thickness between the support members 132 #1 and 132 #2.

As shown in FIG. 12C, a thrust bearing 10f may include a member 17 corresponding to the support member 132 and disposed between the plate-shaped member 122 of the underlay foil portion 12 and the support member 132 #2 of the support foil portion 13. When the dynamic pressure generated along with the rotation of the rotary member is applied to the plate-shaped member 111 of the top foil portion 11, the upstream side of the flat portion 1112 of the plate-shaped member 111 in the rotation direction is pressed toward the back plate 16 compared to the downstream side of the flat portion 1112 in the rotation direction due to the member 17.

Technical Effects

As described above, in the thrust bearings 10*d*, 10*e*, and 10*f*, when the dynamic pressure generated along with the rotation of the rotary member is applied to the plate-shaped member 111 of the top foil portion 11, the upstream side of the flat portion 1112 of the plate-shaped member 111 in the rotation direction is pressed toward the back plate 16 compared to the downstream side of the flat portion 1112 in the rotation direction. That is, the flat portion 1112 is inclined due to the dynamic pressure so that the upstream side of the flat portion 112 in the rotation direction is closer to the back plate 16 than the downstream side of the flat portion 1112 in the rotation direction.

As described in the eighth embodiment, when the rated rotation speed of the rotary member is relatively low, the flat portion 1112 is desirably inclined so that the upstream side of the flat portion 1112 in the rotation direction is closer to the back plate 16 than the downstream side of the flat portion 1112 in the rotation direction as indicated by, for example, the long dashed double-short dashed line in FIG. 11B. With the thrust bearings 10*d*, 10*e*, and 10*f*, the shape of the clearance between the plate-shaped member 111 and the rotary member can be suited to the case where the rated rotation speed of the rotary member is relatively low.

Tenth Embodiment

Figure 13A:
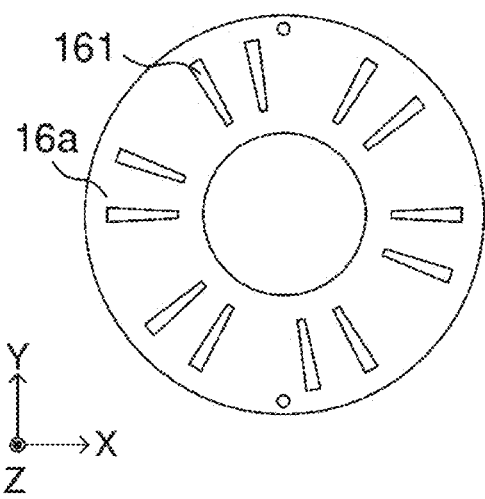
FIG. 13A is a plan view showing an example of a back plate according to the embodiments.
Figure 13B:
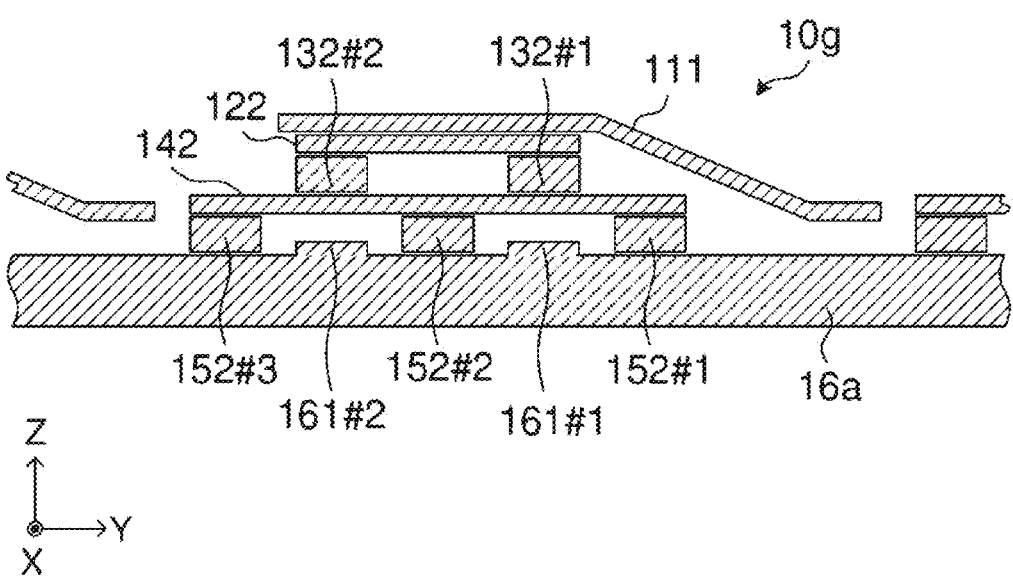
FIG. 13B is a sectional view of a thrust bearing including the back plate according to the embodiments.

A thrust bearing according to a tenth embodiment will be described with reference to FIGS. 13A and 13B. In the tenth embodiment, description that overlaps the description of the first embodiment will be omitted as appropriate. FIG. 13A is a plan view showing a back plate 16*a*. FIG. 13B is a sectional view of a thrust bearing 10*g* including the back plate 16*a* taken along line 3B-3B (see FIG. 3A). In FIG. 13B, each layer and each member are shown on different scales so that they can be recognized on the drawing.

As shown in FIG. 13A, the back plate 16*a* includes 12 protrusions 161 formed on the surface that faces the rotary member (e.g., the rotary member 50). In the back plate 16*a*, each protrusion 161 is formed at a position where it overlaps each support member 132 of the support foil portion 13 in a plan view of the thrust bearing 10*g* from the top foil portion 11 side. The number of protrusions 161 is not limited to 12, but may be 11 or less, or 13 or more. The number of protrusions 161 may correspond to the number of support members 132.

As shown in FIG. 13B, a protrusion 161 #1 may be formed at a position where it overlaps the support member 132 #1 in a plan view of the thrust bearing 10*g* from the top foil portion 11 side. A protrusion 161 #2 may be formed at a position where it overlaps the support member 132 #2 in a plan view of the thrust bearing 10*g* from the top foil portion 11 side.

Technical Effects

When the dynamic pressure generated along with the rotation of the rotary member (e.g., the rotary member 50) is applied to the plate-shaped member 111 of the top foil portion 11, a force is applied to part of the plate-shaped member 142 via the support member 132 #1 to cause deflection of the part of the plate-shaped member 142, and a force is applied to the other part of the plate-shaped member 142 via the support member 132 #2 to cause deflection of the other part of the plate-shaped member 142.

As a result, the height of the thrust bearing 10*g* (i.e., the distance in the Z-axis direction) decreases.

In the thrust bearing 10*g*, the amount of deflection of the part of the plate-shaped member 142 and the amount of deflection of the other part of the plate-shaped member 142 can be limited by the protrusions 161 (e.g., the protrusions 161 #1 and 161 #2). That is, in the thrust bearing 10*g*, the protrusions 161 can control the amount of change in the height of the thrust bearing 10*g*. For example, the amount of change in the height of the thrust bearing 10*g* can be controlled in micrometers by controlling the heights of the protrusions 161.

When the height of the thrust bearing 10*g* changes, the distance between the rotary member and the stationary member also changes. As described above, the amount of change in the height of the thrust bearing 10*g* can be controlled in micrometers by controlling the heights of the protrusions 161. Therefore, the thrust bearing 10*g* can control the distance between the rotary member and the stationary member in micrometers. Thus, the thrust bearing 10*g* can control the distance between the rotary member and the stationary member with high accuracy with a relatively simple structure.

Various aspects of the disclosure derived from the above embodiments will be described below.

A thrust bearing according to one aspect of the disclosure includes an upper foil portion including a bearing surface that faces a rotary member rotatable about a rotation axis, and a lower foil portion that elastically supports the upper foil portion. The upper foil portion is divided into a plurality of portions. In the above embodiments, the "top foil portion 11" is an example of the "upper foil portion", and the "underlay foil portion 12", the "support foil portion 13", the "pad foil portion 14", the "support foil portion 15", and the "back plate 16" are examples of the "lower foil portion". In the above embodiments, the "plurality of plate-shaped members 111" is an example of the "plurality of portions".

The thrust bearing may include, as the lower foil portion, an underlay foil portion including a first plate-shaped member that planarly supports part of the bearing surface of the upper foil portion.

In this aspect, the lower foil portion may include a first support foil portion disposed below the underlay foil portion and including a plurality of first support members, a pad foil portion disposed below the first support foil portion and including a second plate-shaped member corresponding to the first plate-shaped member, and a second support foil portion disposed below the pad foil portion and including a plurality of second support members. The first plate-shaped member may be supported by two first support members out of the plurality of first support members, one first support member out of the two first support members may be supported by part of the second plate-shaped member and two second support members out of the plurality of second support members, and the other first support member out of the two first support members may be supported by the other part of the second plate-shaped member, one second support member out of the two second support members, and another second support member different from the two second support members out of the plurality of second support members.

In this aspect, the lower foil portion may elastically support the upper foil portion to cause a support stiffness of each of the portions on an upstream side in a rotation direction of the rotary member to be smaller (i.e., lower) than a support stiffness of each of the portions on a downstream side in the rotation direction.

In this aspect, the one first support member may be disposed on the upstream side of the other first support member in the rotation direction, and a distance between the two second support members may be larger than a distance between the one second support member and the other second support member. In the above embodiments, the "pitch PA" is an example of the "distance between the two second support members", and the "pitch PB" is an example of the "distance between the one second support member and the other second support member".

Alternatively, a thickness of the first plate-shaped member on the upstream side in the rotation direction may be smaller than a thickness of the first plate-shaped member on the downstream side in the rotation direction. Alternatively, the one first support member may be disposed on the upstream side of the other first support member in the rotation direction, and a thickness of the one first support member may be smaller than a thickness of the other first support member.

In the aspect in which the underlay foil portion is provided as the lower foil portion, the underlay foil portion may include a first annular member extending in a circumferential direction of the thrust bearing, the first plate-shaped member disposed in an area surrounded by the annular member, and a first connection member connecting the first annular member and the first plate-shaped member. A length along a shape of the first connection member from a first connection point between the first annular member and the first connection member to a second connection pointbetween the first plate-shaped member and the first connection member may be larger than a length of a straight line connecting the first connection point and the second connection point.

In the aspect in which the first support foil portion is provided as the lower foil portion, the first support foil portion may include a second annular member extending in a circumferential direction of the thrust bearing, the first support members disposed in an area surrounded by the annular member, and a second connection member connecting the second annular member and one first support member out of the plurality of first support members. A length along a shape of the second connection member from a third connection point between the second annular member and the second connection member to a fourth connection point between the one first support member and the second connection member may be larger than a length of a straight line connecting the third connection point and the fourth connection point.

In the aspect in which the first support foil portion, the pad foil portion, and the second support foil portion are provided as the lower foil portion, the part of the second plate-shaped member and the two second support members may define a double-end supported beam structure that supports the one first support member, and the other part of the second plate-shaped member, the one second support member, and the other second support member may define a double-end supported beam structure that supports the other first support member.

The present disclosure is not limited to the above embodiments, but may be modified as appropriate without departing from the gist or spirit of the disclosure that can be read from the whole of the claims and the specification, and thrust bearings with such modifications are also included in the technical scope of the present disclosure.

What is claimed is:

1. A thrust bearing comprising:
an upper foil portion including a bearing surface that faces a rotary member rotatable about a rotation axis; and
a lower foil portion that elastically supports the upper foil portion, wherein the upper foil portion is divided into a plurality of portions,
wherein the lower foil portion includes an underlay foil portion including a first plate-shaped member that planarly supports part of the bearing surface of the upper foil portion;
wherein the lower foil portion includes
a first support foil portion disposed below the underlay foil portion and including a plurality of first support members,
a pad foil portion disposed below the first support foil portion and including a second plate-shaped member corresponding to the first plate-shaped member, and
a second support foil portion disposed below the pad foil portion and including a plurality of second support members;
wherein the first plate-shaped member is supported by two first support members out of the plurality of first support members;
wherein one first support member out of the two first support members is supported by one part of the second plate-shaped member and two second support members out of the plurality of second support members; and
wherein the other first support member out of the two first support members is supported by a different part from the one part of the second plate-shaped member, one second support member out of the two second support members, and a different second support member from the two second support members.

2. The thrust bearing according to claim 1, wherein the lower foil portion elastically supports the upper foil portion to cause a support stiffness of each of the plurality of portions on an upstream side in a rotation direction of the rotary member to be smaller than a support stiffness of each of the plurality of portions on a downstream side in the rotation direction.

3. The thrust bearing according to claim 2, wherein:
the one first support member out of the two first support members is, in the rotation direction, disposed on the upstream side of the other first support member out of the two first support members; and
a distance between the two second support members is larger than a distance between the one second support member out of the two second support members and the different second support member from the two second support members.

4. The thrust bearing according to claim 2, wherein a thickness of the first plate-shaped member on the upstream side in the rotation direction is smaller than a thickness of the first plate-shaped member on the downstream side in the rotation direction.

5. The thrust bearing according to claim 2, wherein:
the one first support member out of the two first support members is, in the rotation direction, disposed on the upstream side of the other first support member out of the two first support members; and
a thickness of the one first support member out of the two first support members is smaller than a thickness of the other first support member out of the two first support members.

6. The thrust bearing according to claim 2, wherein:

the one part of the second plate-shaped member and the two second support members define a double-end supported beam structure that supports the one first support member out of the two first support members; and the different part from the one part of the second plate-shaped member, the one second support member out of the two second support members, and the different second support member from the two second support members define a double-end supported beam structure that supports the other first support member out of the two first support members.

7. The thrust bearing according to claim 1, wherein:

the first plate-shaped member of the underlay foil portion is disposed in an area surrounded by a first annular member;

the underlay foil portion further includes the first annular member extending in a circumferential direction of the thrust bearing, and a first connection member connecting the first annular member and the first plate-shaped member;

a length along a shape of the first connection member from a first connection point to a second connection point is larger than a length of a straight line connecting the first connection point and the second connection point;

the first connection point is a connection point between the first annular member and the first connection member; and the second connection point is a connection point between the first plate-shaped member and the first connection member.

8. The thrust bearing according to claim 1, wherein:

the first support foil portion includes a second annular member extending in a circumferential direction of the thrust bearing, the first support members disposed in an area surrounded by the second annular member, and a second connection member connecting the second annular member and the one first support member out of the plurality of first support members;

a length along a shape of the second connection member from a third connection point to a fourth connection point is larger than a length of a straight line connecting the third connection point and the fourth connection point;

the third connection point is a connection point between the second annular member and the second connection member; and the fourth connection point is a connection point between the one first support member and the second connection member.

9. A thrust bearing comprising:

an upper foil portion including a bearing surface that faces a rotary member rotatable about a rotation axis; and a lower foil portion that elastically supports the upper foil portion, wherein the upper foil portion is divided into a plurality of portions;

wherein the lower foil portion includes an underlay foil portion including a first plate-shaped member that planarly supports part of the bearing surface of the upper foil portion;

wherein the first plate-shaped member of the underlay foil portion is disposed in an area surrounded by a first annular member;

wherein the underlay foil portion further includes:

the first annular member extending in a circumferential direction of the thrust bearing, and a first connection member connecting the first annular member and the first plate-shaped member;

wherein a length along a shape of the first connection member from a first connection point to a second connection point is larger than a length of a straight line connecting the first connection point and the second connection point;

wherein the first connection point is a connection point between the first annular member and the first connection member; and wherein the second connection point is a connection point between the first plate-shaped member and the first connection member.

* * * * *